US 7,824,131 B2

(12) United States Patent
Chelaru

(10) Patent No.: US 7,824,131 B2
(45) Date of Patent: Nov. 2, 2010

(54) BUILDING OVER THE WATER, GROUP OF BUILDINGS, THEIR MANEUVERING METHODS AND THEIR HOSTING SITES

(76) Inventor: Silviu Dorian Chelaru, Str. Doamna Ghica nr. 5, bl, 3, sc. 1, ap. 34, sector 2, Bucharest (RO)

( * ) Notice: Subject to any disclaimer, the term of this patent is extended or adjusted under 35 U.S.C. 154(b) by 821 days.

(21) Appl. No.: 10/598,572

(22) PCT Filed: Mar. 2, 2005

(86) PCT No.: PCT/RO2005/000003

§ 371 (c)(1),
(2), (4) Date: Sep. 5, 2006

(87) PCT Pub. No.: WO2005/085055

PCT Pub. Date: Sep. 15, 2005

(65) Prior Publication Data

US 2007/0163483 A1 Jul. 19, 2007

(30) Foreign Application Priority Data

Mar. 4, 2004 (RO) ............................... 2004-00197

(51) Int. Cl.
*E02B 17/00* (2006.01)
*B63B 25/00* (2006.01)
*B63B 35/44* (2006.01)

(52) U.S. Cl. ..................... 405/207; 405/200; 405/204; 114/258

(58) Field of Classification Search .............. 405/195.1, 405/200, 203–207; 114/322, 339, 258
See application file for complete search history.

(56) References Cited

U.S. PATENT DOCUMENTS

| 3,528,254 | A | | 9/1970 | Graham | |
|---|---|---|---|---|---|
| 5,125,769 | A | * | 6/1992 | Lee et al. | 405/204 |
| 6,293,734 | B1 | * | 9/2001 | Thomas et al. | 405/209 |
| 6,409,431 | B1 | * | 6/2002 | Lynch | 405/200 |
| 6,585,454 | B1 | * | 7/2003 | Fisher et al. | 405/218 |
| 6,648,554 | B1 | * | 11/2003 | Sehl | 405/219 |
| 6,648,555 | B2 | * | 11/2003 | Mommaas et al. | 405/224 |

(Continued)

FOREIGN PATENT DOCUMENTS

DE 2716481 A1 10/1978

(Continued)

*Primary Examiner*—Tara Mayo-Pinnock
(74) *Attorney, Agent, or Firm*—Brooks Kushman P.C.

(57) ABSTRACT

A building over the water, maneuvering methods for the building and hosting sites of the building. The buildings including a superstructure (A) provided a floor structure (1) that is placed over a water surface (2) on which an inhabitable subassembly (3) is positioned, a support (B) sitting on ground (4) positioned under the floor structures (1), and mobile floating docks (C) with variable and controllable buoyancy that includes a load carrying platform (5) positioned under the floor structure (1). The superstructure (A) is held above the water surface (2) by the supports (B), that sit on the ground (4), and respectively carried by the floating docks (C), the superstructure being detachable from the ground (4), and transportable on water on the mobile floating docks (C), thus being possible to reposition the superstructure (A) on ground (4), at a destination of choice.

63 Claims, 15 Drawing Sheets

U.S. PATENT DOCUMENTS

| | | | |
|---|---|---|---|
| 6,712,558 B2 * | 3/2004 | McAlister | 405/217 |
| 6,715,439 B1 * | 4/2004 | Ortelli | 114/339 |
| 6,808,337 B1 * | 10/2004 | Thomsen | 405/203 |
| 6,913,418 B2 * | 7/2005 | Chen et al. | 405/31 |
| 6,923,598 B2 * | 8/2005 | Vatsvåg | 405/203 |
| 6,926,468 B2 * | 8/2005 | Sehl | 405/219 |
| 7,011,472 B2 * | 3/2006 | Martensson et al. | 405/205 |

FOREIGN PATENT DOCUMENTS

| | | |
|---|---|---|
| EP | 0082034 A | 6/1983 |
| EP | 0253969 A2 | 1/1988 |
| FR | 2644749 A | 9/1990 |

\* cited by examiner

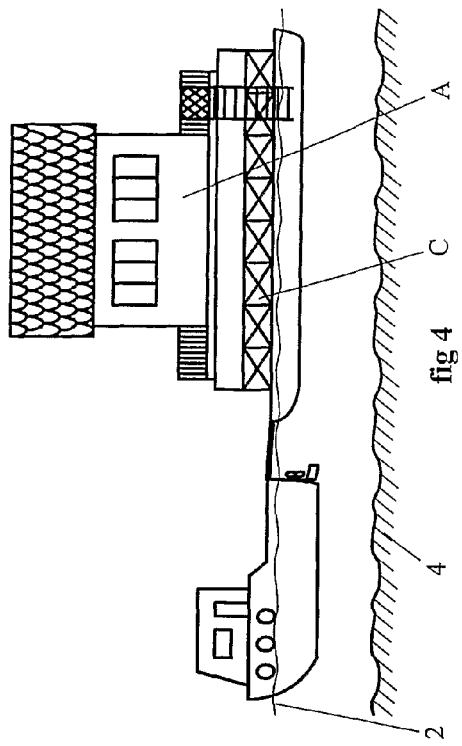
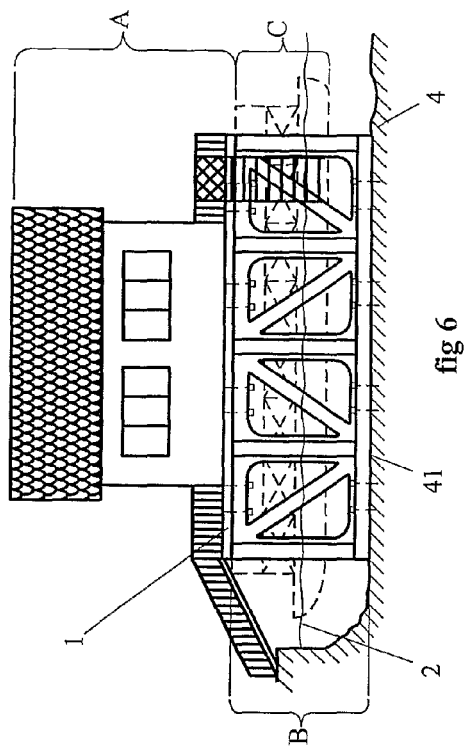
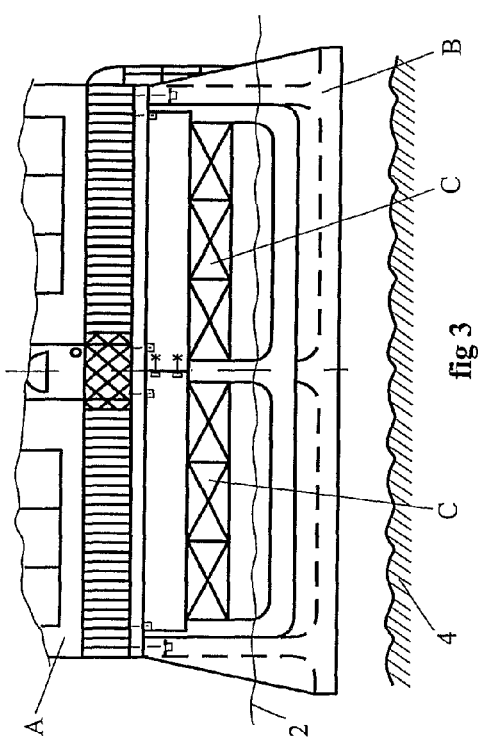
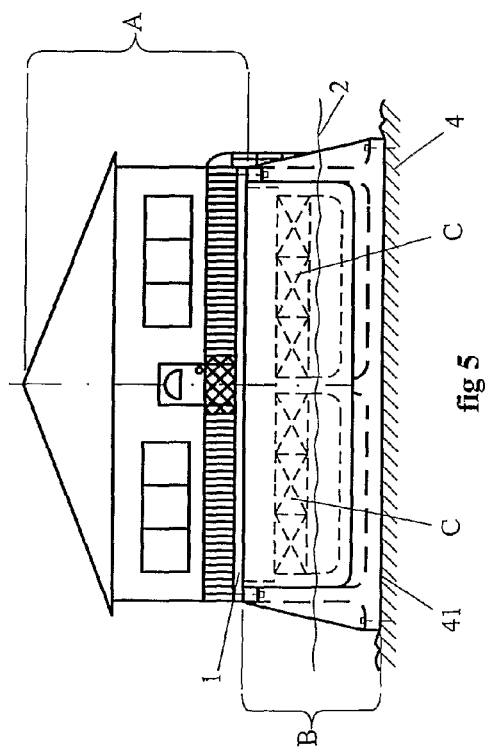

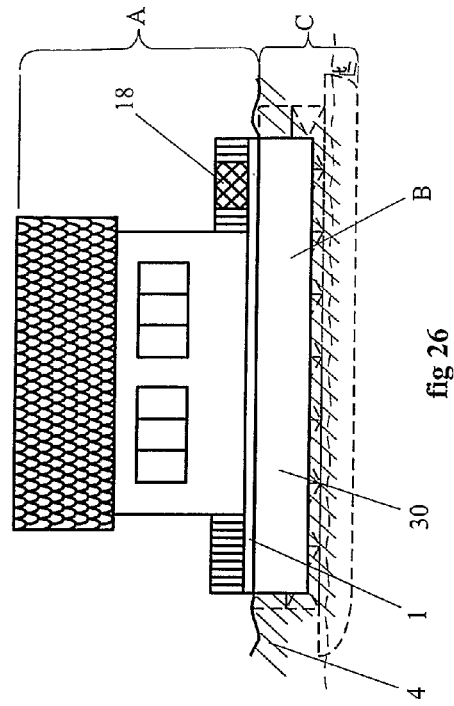
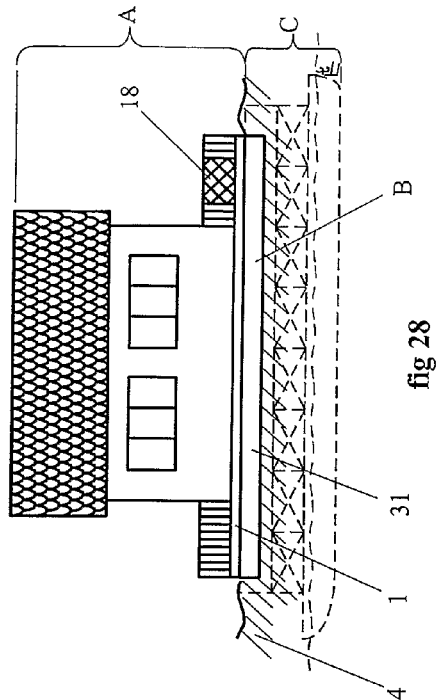
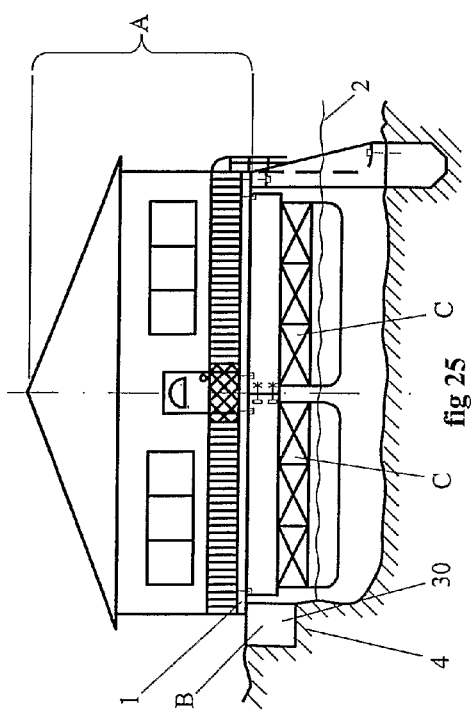
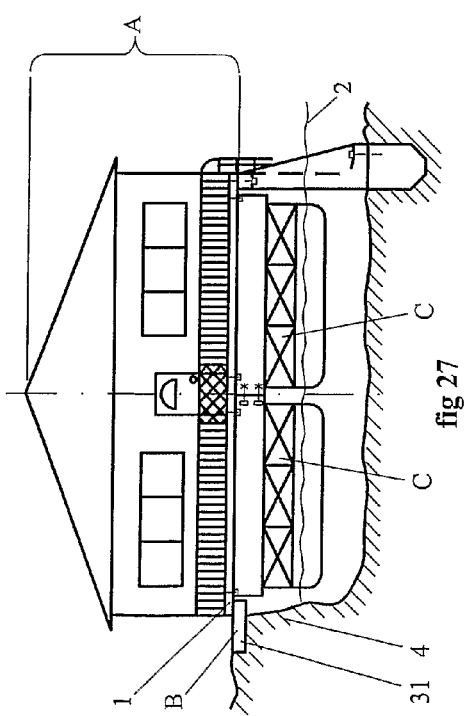

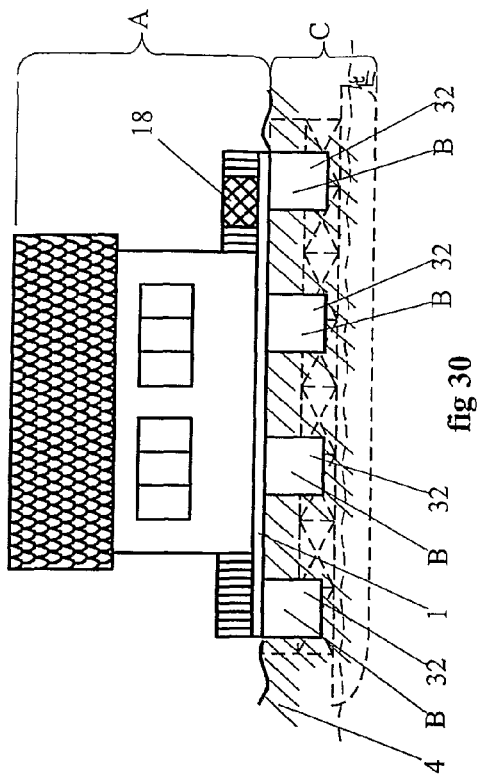
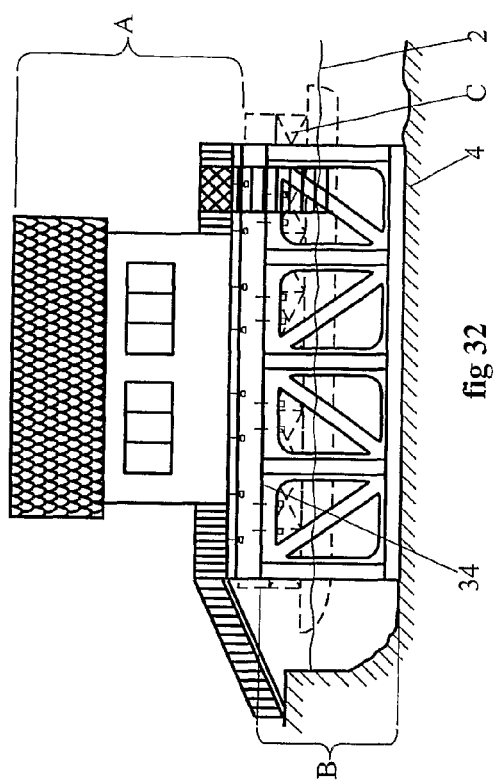
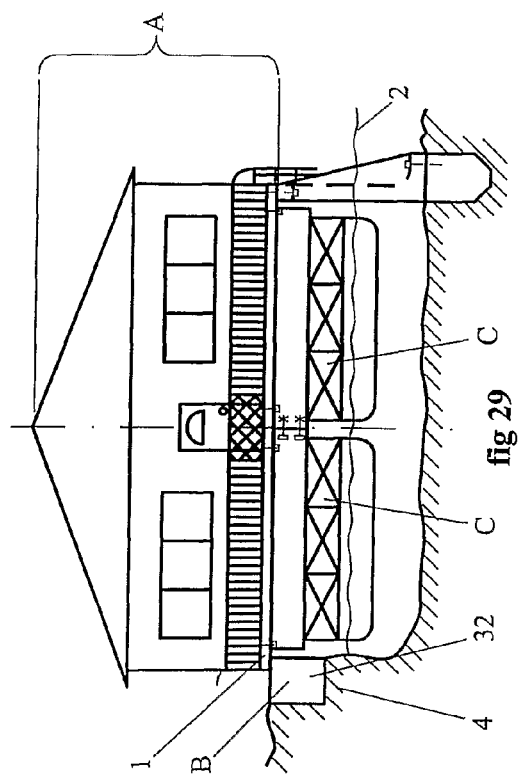
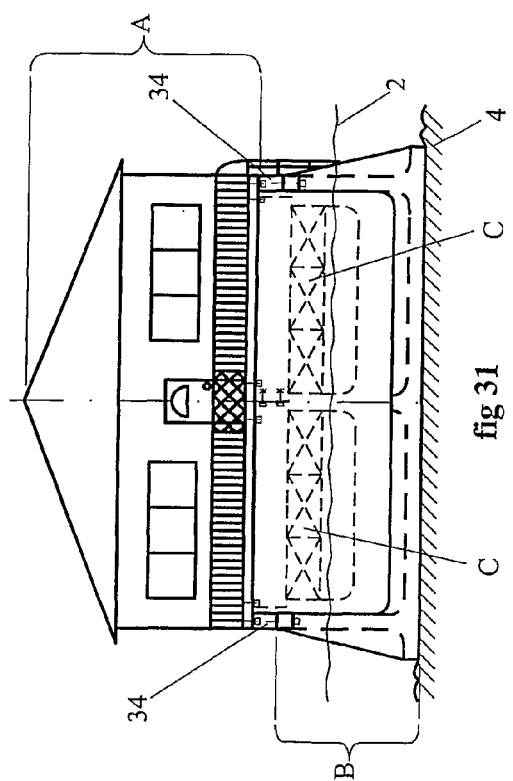

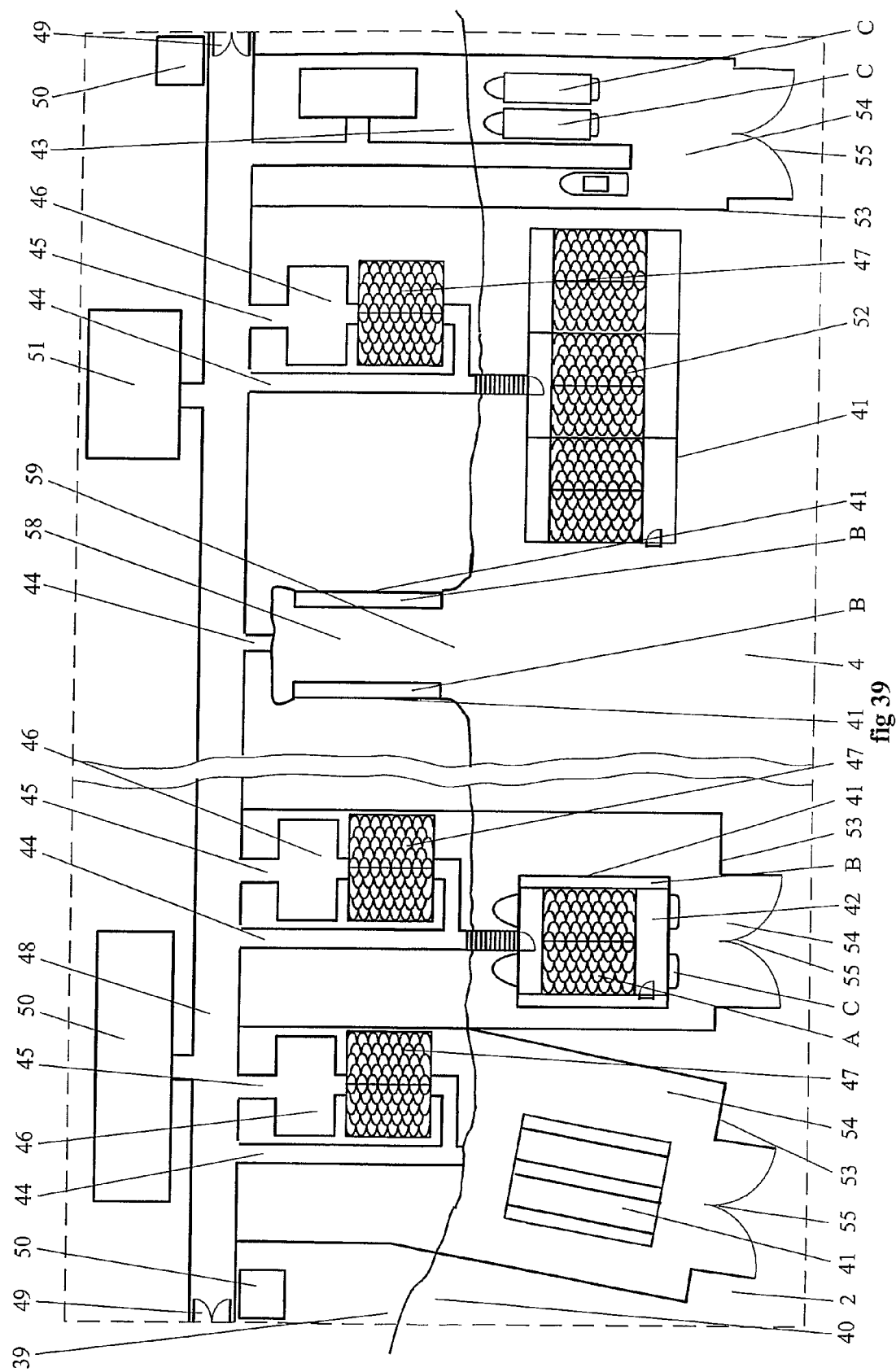

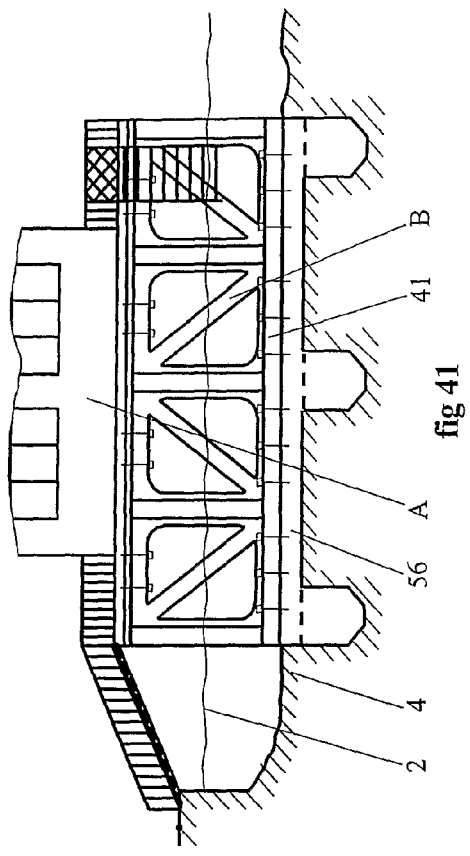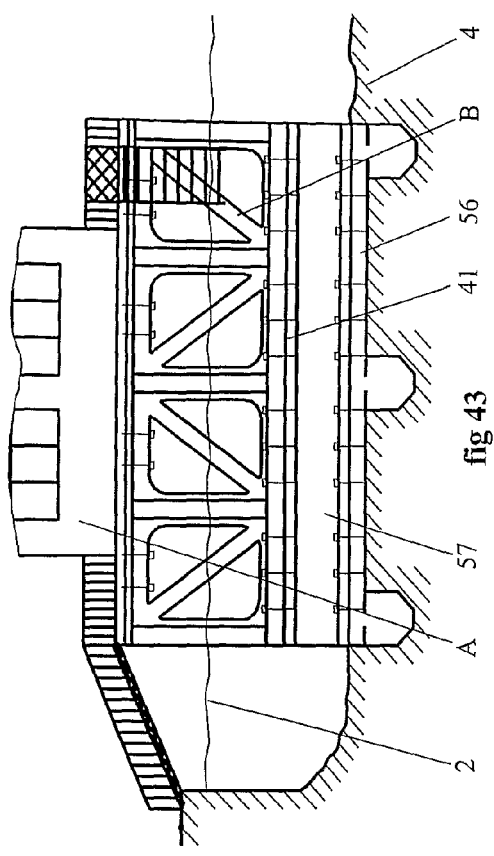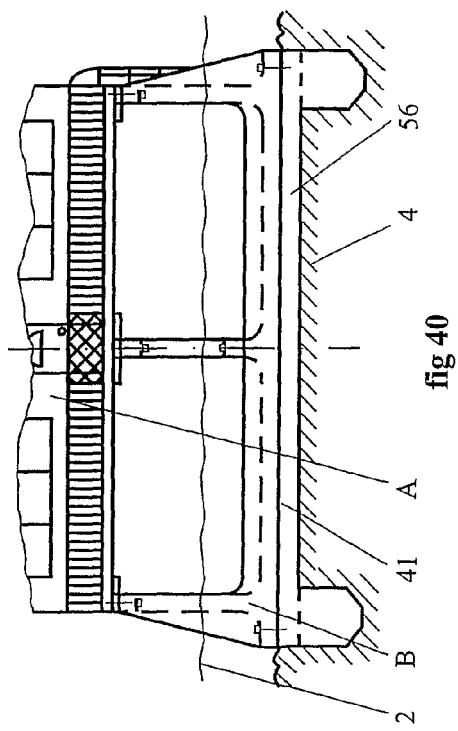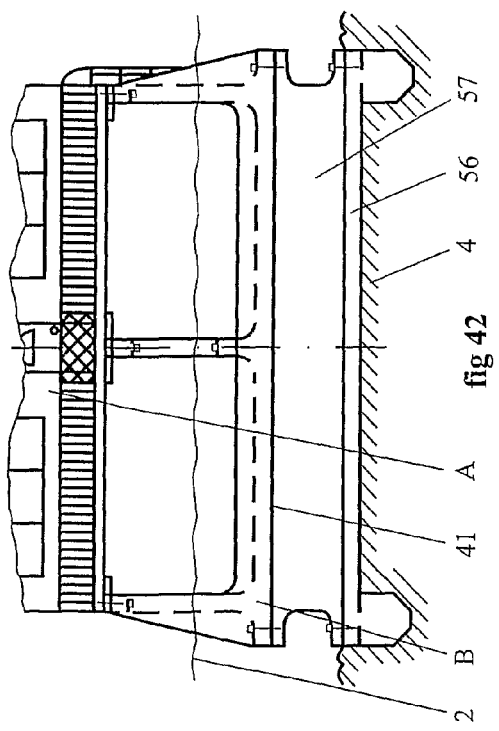

BUILDING OVER THE WATER, GROUP OF BUILDINGS, THEIR MANEUVERING METHODS AND THEIR HOSTING SITES

FIELD OF INVENTION

The invention refers to a building over the water, to a group of buildings of this nature, to their maneuvering methods, and to specifically configured sites that can host buildings over the water and groups of buildings.

BACKGROUND OF THE INVENTION

Many types of land-based buildings located near or above water are known, some of them built on piers or on floaters for withstanding land floods, and usually built on valuable reclaimed land incorporating a high volume of work. These buildings cannot be moved or repositioned, and the land-locked buildings positioned on floaters are quite difficult to build and to maintain, especially if they a large-sized.

Also, diverse ships and houseboats are known, being used for passenger transportation and hosting, some of them being inhabited for long periods of time. The disadvantages of these ships relate to the fact that, because they float permanently, they offer lower comfort and safety, especially under high wind, swell, strong stream, or eddy conditions.

Some offshore drilling platforms that can float, navigate, or rest on the sea floor, are also known. The disadvantage of these platforms is that their main purpose is oil and gas exploration and production, and their construction, size, and weight, are very different from those of the present invention. These platforms require expensive and complex engineering solutions and they are positioned and used on inadequate sites and in harsh environments like deep water, high swell, hard access, and usually they lack utilities and services from shore, their maneuvering being rather complex and hard to accomplish.

The technical aspects solved by the present invention consist of achieving a building and a group of buildings, each of the said buildings being configured for being located in a fixed position over the water surface, on a hosting site, where it sits on the ground, and also being configured for floating and moving on water.

SUMMARY OF THE INVENTION

The invention refers to a building over the water that removes the disadvantages mentioned above by the fact that it consists of: a superstructure provided with at least one of some floor structures that is placed above a water surface and on which an inhabitable subassembly is positioned, at least one of some supports sitting on ground consisting of the bottom of a navigable body of water and of its shores, the said support being positioned under the said floor structures, and at least one of some mobile floating docks with variable and controllable buoyancy, each dock being provided with a load carrying platform positioned under the floor structures, the said superstructure being sequentially held above the water surface by the supports, while sitting on the ground, and respectively carried by the docks, while floating, the superstructure being detachable from the ground, and transportable on water on the mobile floating docks, thus being possible to reposition the superstructure on the ground, at a destination of choice, the supports being detachably or permanently secured to the floor structures, in case that the said supports are detachably secured, the superstructure that is detached from these supports being carried while floating on the docks without the said detachable supports, being removed from the detached supports, and being repositioned on the ground, directly on shore, or by means of some supports, the mobile floating docks being also detachably or permanently secured to the floor structures by means of their platforms, the detachably secured docks having capabilities of being removed from under the superstructure that sits on the ground by means of the supports, or that sits on the shore, and later the removed docks being repositioned and reattached under the superstructure, at least one of the mobile floating docks comprising at least one of some floaters secured under the load carrying platform, floater that contains at least one of some ballastable chambers that can be flooded with or emptied of water, the water level in each chamber being or not being independently adjustable and being or not being automatically adjustable, each mobile floating dock being provided with some mechanical guiding subassemblies with variable and real-time adjustable length, used for reducing the impact of the swell, currents, and wind, by guiding the dock with or without the superstructure or the supports attached, while positioning this dock with regard to the ground or with regard to the supports that sit on the ground, or by guiding the dock while it is being attached under or detached from a superstructure, each guiding subassembly being connected at one end to the floating dock by means of an articulation, and, during the guiding operations, being attached at the other end into a detachable articulation built on a structure fixed with regard to the ground, at least one of the mobile floating docks being also equipped with at least one of some propulsion groups.

The superstructure has its inhabitable subassembly provided with at least one of some inhabitable levels positioned on the floor structures, the said level comprising some walls that delimit some rooms, upon these levels being placed at least one roof, some windows and some doors being installed in the openings of the walls, the inhabitable subassembly being furnished and provided with heating, ventilation and air conditioning systems, the inhabitable subassembly being also provided with some decks surrounded by some handrails provided with some access gates, with at least one of some removable access bridges, and with at least one of some stepladders positioned toward the water surface and leading to the floor structure, the superstructure being provided with some electrical, water, sewage, and gas installations and with cable or optical fiber installations for phone/TV/data, connected to the appropriate land-based utilities and service providers when available, through at least one of some groups of detachable connectors, and the docks being provided with on-board electrical generators, fresh water tanks, sewage tanks, natural gas/propane containers, and transceivers for voice and data, compatible with the installations of the superstructure, providing utilities and services that are connected through the same group of detachable connectors, or through other detachable connectors, to the appropriate installations of the superstructure, thus supplying utilities and services when not available from ground.

The building claimed by the invention is provided with at least one of some posts that holds the superstructure by means of at least one of some upper beams, the said upper beams being fixed on the said posts that sit on the ground by means of a bottom plate that makes up the lower part of the support, the bottom plate being detachable from the ground it sits on, and having mutual compatible assembly capabilities with the ground, at least one of the supports being also provided with some braces.

The building over the water, in another configuration, has at least one of its bottom plates permanently fixed to the ground.

According to the invention, the building over the water has at least one of its posts permanently fixed to the bottom plate, in another configuration the building over the water having at least one of its posts detachable from the bottom plate, so that this post can be removed from the bottom plate, or replaced with items of similar height, and in yet another configuration, at least one of the detachable posts is hinged to the bottom plate, by means of at least one of some articulation joints.

Also, according to the invention the building over the water is provided with at least one brace that is permanently fixed to its supports, and in another configuration the building over has at least one brace detachably assembled to and removable from the supports.

The building over the water, in another configuration, has at least one of its supports provided with at least one post on which the superstructure sits directly, the beams being absent.

The building over the water, in another configuration, has at least one of its posts sitting directly on the ground.

The building over the water, in another configuration, has at least one of its posts sitting on the ground by means of a post foundation on which the post is permanently fixed, or is detachably assembled, in yet another configuration, at least one of the detachable posts is hinged to the post foundation by means of at least one of some articulation joints.

In other configurations recommended for positioning the building claimed by the invention on ground higher than the water surface or on the bottoms of shallow waters, where shorter supports are required, the said building has at least one of its supports build with at least one of some support beams, or of some support plates, the said beams and plates being positioned horizontally, or the said building has at least one of its supports built with at least one of some support blocks, the said beams, plates, and blocks being embedded into the ground, either directly or by being attached to some foundations.

The building claimed by the invention has its floor structures placed directly on the supports, or, in another configuration, by means of some sole plates for support positioning that are components of the superstructure, and are fixed to the floor structures.

In another configuration, the building claimed by the invention, for increasing the height of its floor structures with regard to the ground and to the water surface, is provided with some extension beams secured to the supports, on which the floor structures is positioned and detachably secured.

The building claimed by the invention has the platforms of its floating docks attached to the floor structures directly, or, in another configuration, by means of some sole plates for dock positioning.

The building claimed by the invention provided with multiple docks has their adjacent platforms assembled together, in order to achieve a rigid structure that supports the superstructure. These mutual assembled docks are permanent or detachable, and are directly assembled to each other or, for reducing the loads upon the superstructure while maneuvering it, they include at least one of the posts, upper beams, and braces between the adjacent docks.

In an alternate configuration, the building claimed by the invention is provided with at least one of the floating docks with floaters containing the ballastable chambers, the said dock being built from some reinforced floating caissons having the shape of equal parallelepipeds, floating caissons that form the ballastable chambers and that are assembled to each others, the upper decks of these reinforced upper caissons being used as the carrying platform for the superstructure.

The building claimed by the invention, in an alternate configuration, is provided with at least one mobile floating dock that comprises at least one of some floaters at least vertically mobile with regard to the appropriate carrying platform, the mobility of the said floater being achieved by means of at least one of some mechanical subassemblies connecting each floater to the appropriate platform, the actuation of the mechanical subassemblies and the induced movement of the floaters being automatically or manually controlled, and being independently controllable or not.

In a configuration, when the superstructure needs to be floatable at low water levels, the building claimed by the invention has its superstructure sustained by the platforms by means of at least one of some removable extension subassemblies.

The invention also refers to a group of buildings that removes the disadvantages mentioned above by the fact that it comprises at least two superstructures positioned next to each other, on at least one of some supports standing on the ground, each of the superstructure being permanently fixed or detachably assembled to at least one of the neighboring superstructure, the superstructures being sequentially carried and transported over the water surface by the mobile floating docks. If multiple supports are used as part of the group of buildings, these supports are permanently fixed or detachably assembled to each other.

The invention also refers to a maneuvering method of the buildings over the water claimed by the invention, that removes the disadvantages mentioned above, by the fact that it consists of the following operational phases: the superstructure is detached from ground and from any structure fixed thereto, being carried by the mobile floating docks, while floating; the superstructure, carried by the mobile floating docks, is transported to the desired destination; at the said destination, the superstructure is positioned onto supports in contact with the ground. If the mobile floating docks have been initially removed from under the superstructure, then the docks are positioned under the superstructure and are attached thereto before starting the previously described maneuvering method. If the mobile floating docks are detachable, then they can be detached and moved away at the end of the previously described maneuvering method.

The invention also refers to a hosting site for the buildings over the water claimed by the invention, that removes the disadvantages mentioned above, by the fact that it is placed on a shore area and on part of an adjacent navigable water body where the mobile floating docks that carry superstructures and supports can float, on the ground of the said hosting site being provided at least one of some sitting surfaces on which at least one of some supports sits, and upon which at least one superstructure is positioned, the said superstructure being also sequentially carried by at least one of some mobile floating docks.

The hosting site claimed by the invention is provided with at least one of some utilities and services connected to the installations of the hosted superstructures using the available groups of detachable connectors. The said hosting sites is also provided with at least one of some maintenance and overhaul areas at least partially covered by water, where the buildings over the water claimed by the invention and their subassemblies are maneuvered, maintained, and overhauled, with some pedestrian access paths leading to the sitting surfaces and with some vehicle access paths leading to the same said sitting surfaces, with some parking places located close to each sitting surface and used for the vehicles that transport people, hardware, and materials to the said sitting surfaces, with some storage sheds and garages positioned close to the sitting surfaces and used for the said vehicles, hardware and materials, with some main access roads connected to the said access paths and to at least one of the access point onto the hosting site, with some offices, and with some commercial areas that serve the hosting site.

The hosting site claimed by the invention is provided with at least one of some supports on which at least two superstructures are positioned next to each other, each of the superstructure being assembled to the neighboring superstructure, the superstructures being transportable on water with the help of the mobile floating docks as part of a building over the water, thus positioning a group of buildings claimed by the invention on the said hosting site.

The hosting site claimed by the invention is provided with at least one of some partially submersed constructions that separates at least one of some sections of the navigable water body from the rest of the water body, on the said section being located at least one of the sitting surfaces, the construction being provided with at least one of some gates built in the water, the partially submersed construction being used to control the access on, or from, the separated section of the navigable water body, and being provided with at least one of some gates built in the water, that allows the access of the mobile floating docks, and of the carried-on superstructures and supports, to and from said the sitting surfaces. The partially submersed constructions are watertight and the gates are also watertight when closed, so that the level and the physical and chemical characteristics of the water on at least one side of the said construction can be independently controlled, in an alternate configuration at least one of the said constructions or of the said gates being water permeable.

In an alternate configuration, the hosting site claimed by the invention has at least one of its sitting surfaces built using at least one of some bottom platforms on which at least one support is positioned, the bottom platform being provided with state of the art clamping elements compatible with the assembly elements of the supports, and the said bottom platform being also fixed into the ground.

In an alternate configuration, the hosting site claimed by the invention has at least one of its sitting surfaces built using at least one of some positioning blocks on which at least one of the supports is positioned and assembled, the said blocks being provided with state of the art clamping elements compatible with the assembly elements of the supports, and also being detachably assembled to the ground, the said positioning blocks being used individually, or stacked when necessary to compensate for the high water level at the location of the superstructure.

In an alternate configuration, the hosting site claimed by the invention is provided with at least one of some navigable canals built with at least one of some navigable connection to the navigable water body located beyond the canals, the ground consisting of the shores and bottom of the canals being provided with at least one of the sitting surfaces on which at least one of some supports sits, at least one of some superstructures being positioned upon the said supports, the said superstructure being also sequentially carried by at least one of some mobile floating docks.

In an alternate configuration, the hosting site claimed by the invention is places on a shore area and on part of an adjacent navigable water body where the mobile floating docks that carry superstructures and supports can float, on the ground of the said hosting site being provided at least one of some sitting surfaces built above the water at a height equal to that of the supports sitting on the ground, on this sitting surface built above the water the superstructures being positioned directly, without supports, the said superstructures being transportable on water on mobile floating docks.

BRIEF DESCRIPTION OF THE DRAWINGS

The invention and its operating principles are better understood from the following description given by way of example and with reference to the accompanying FIGS. 1 through 46 that represent:

FIG. 3, front view of a building over the water, transported while floating;

FIG. 4, side view of a building over the water, floating, without supports, tugged by a tugboat;

FIG. 5, front view of a building over the water, without mobile floating docks;

FIG. 6, side view of a building over the water, without mobile floating docks;

FIG. 25, front view of a building over the water with support beam;

FIG. 26, side view of a building over the water with support beam;

FIG. 27, front view of a building over the water with support plate;

FIG. 28, side view of a building over the water with support plate;

FIG. 29, front view of a building over the water with support blocks;

FIG. 30, side view of a building over the water with support blocks;

FIG. 31, front view of a building over the water with extension beams;

FIG. 32, side view of a building over the water with extension beams;

FIG. 39, upper view of a hosting site for the buildings over the water;

FIG. 40, front view detail of a hosting site bottom platform and of a buildings over the water positioned thereon;

FIG. 41, side view detail of a hosting site bottom platform and of a buildings over the water positioned thereon;

FIG. 42, front view detail of a hosting site positioning block and of a buildings over the water positioned thereon;

FIG. 43, side view detail of a hosting site positioning block and of a buildings over the water positioned thereon;

DETAILED DESCRIPTION OF THE INVENTION

Figure 1:
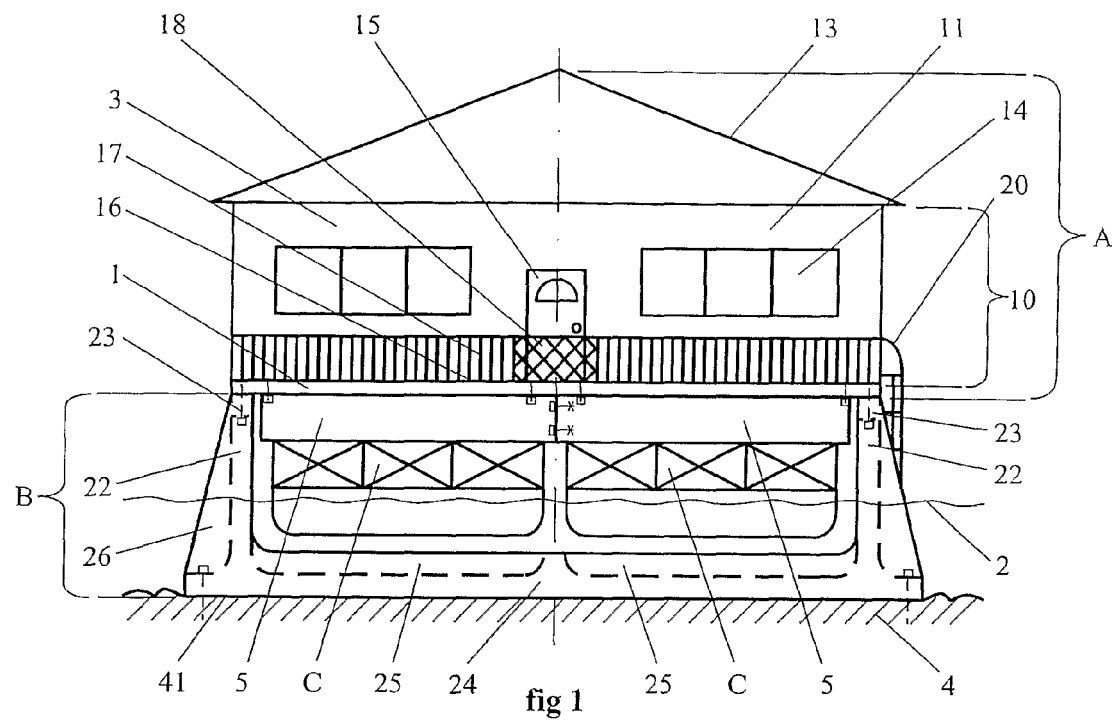
FIG. 1, front view of a building over the water.
Figure 2:
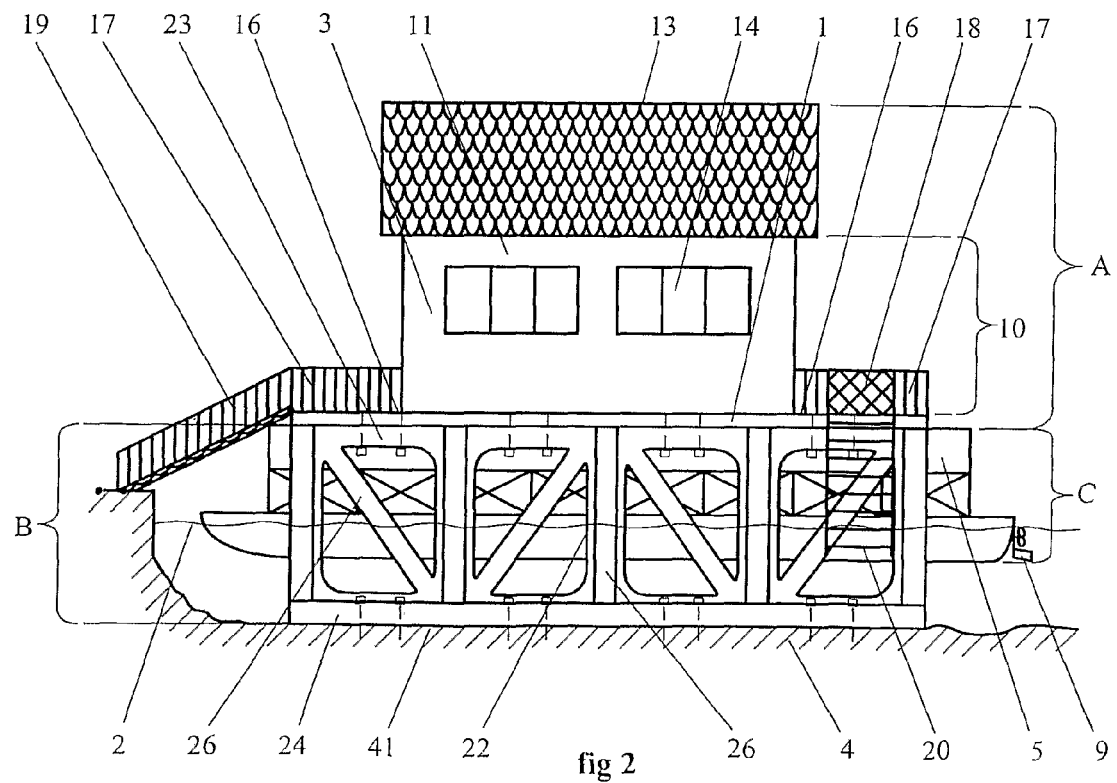
FIG. 2, side view of a building over the water.
Figure 9:
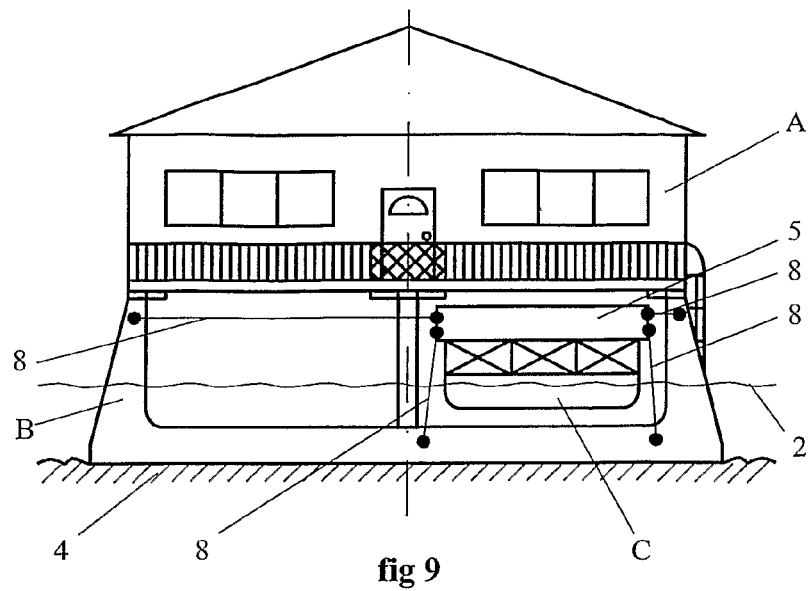
FIG. 9, front view of a building over the water while its mobile floating dock is guided.
Figure 10:
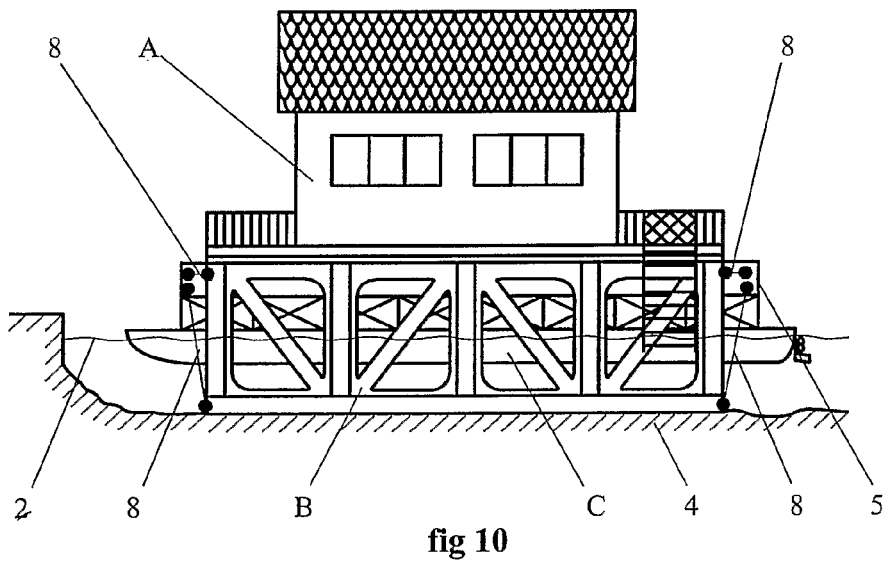
FIG. 10, side view of a building over the water while its mobile floating dock is guided.
Figure 11:
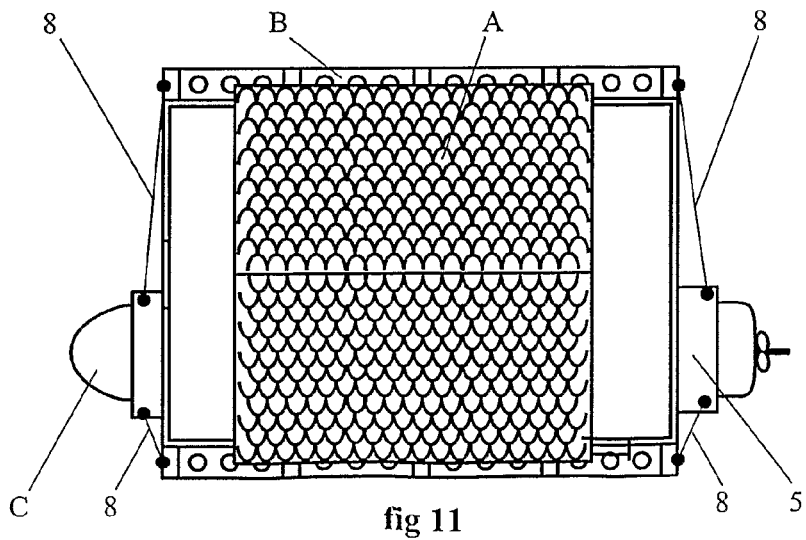
FIG. 11, upper view of a building over the water while its mobile floating dock is guided.
Figure 7:
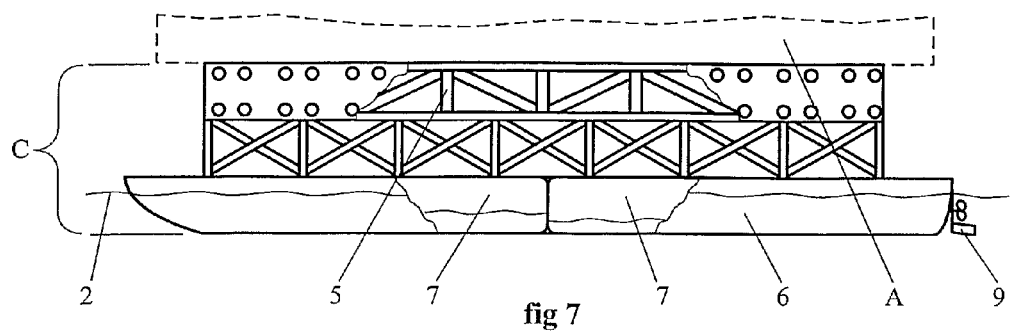
FIG. 7, front view detail of a building over the water with mobile floating docks with ballastable chambers.
Figure 8:
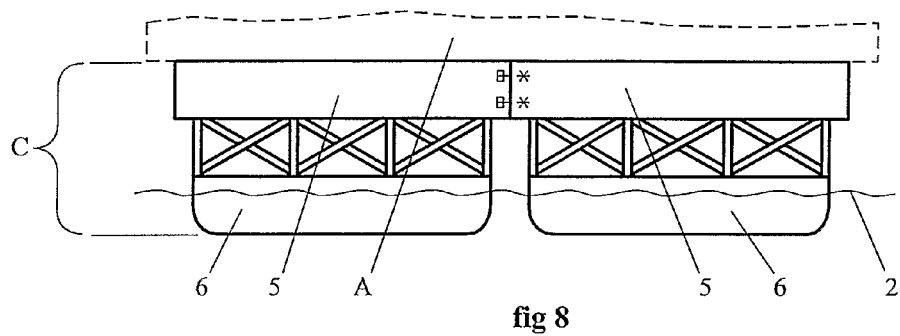
FIG. 8, side view detail of a building over the water with mobile floating docks with ballastable chambers.
Figure 12:
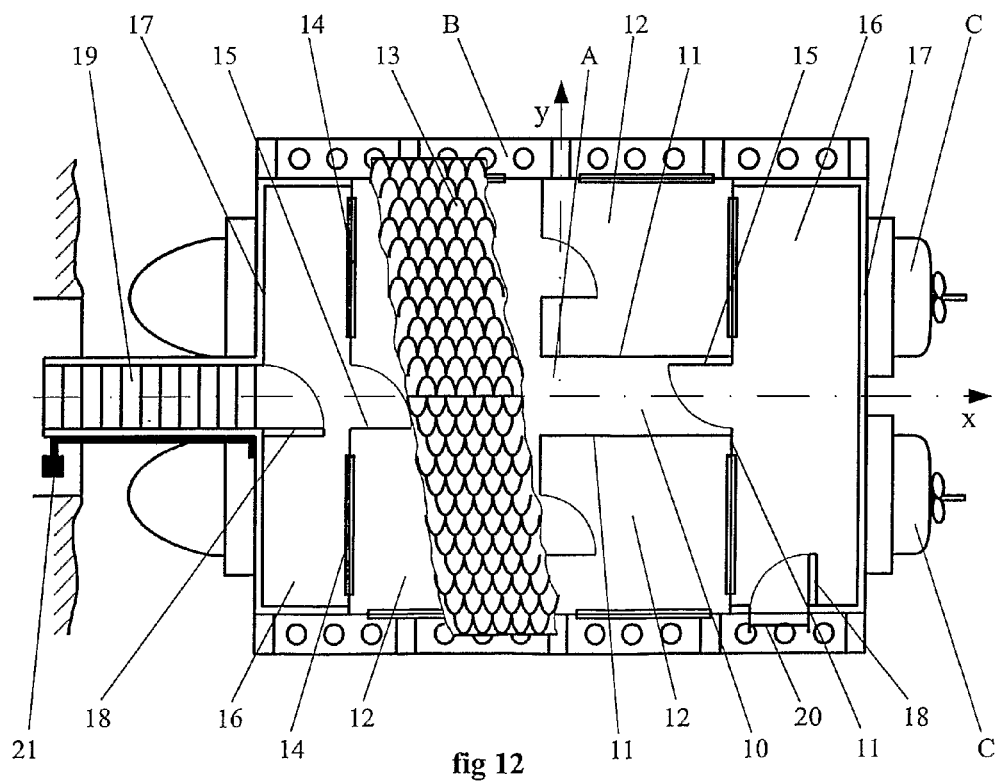
FIG. 12, upper view of a building over the water, with a detail of its inhabitable subassembly.
Figure 13:
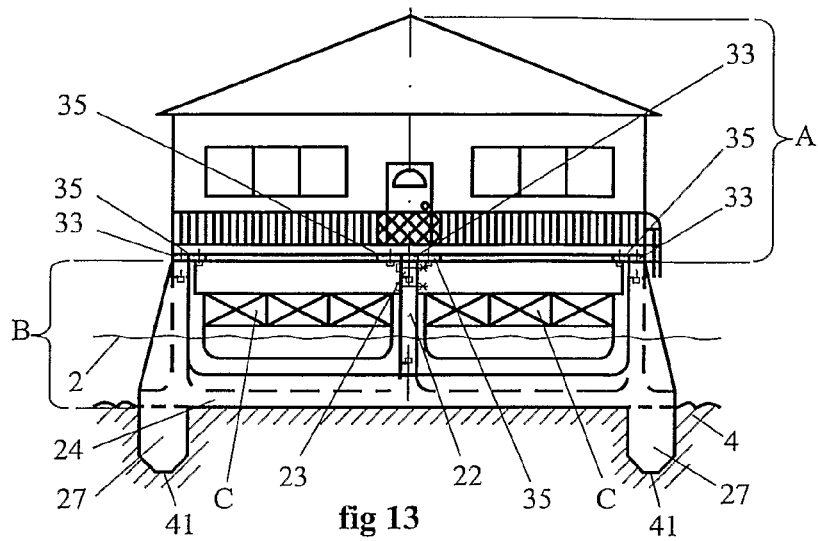
FIG. 13, front view of a building over the water, with a detachable post assembled on the bottom plate, with foundations for the bottom plate and with sole plates.
Figure 14:
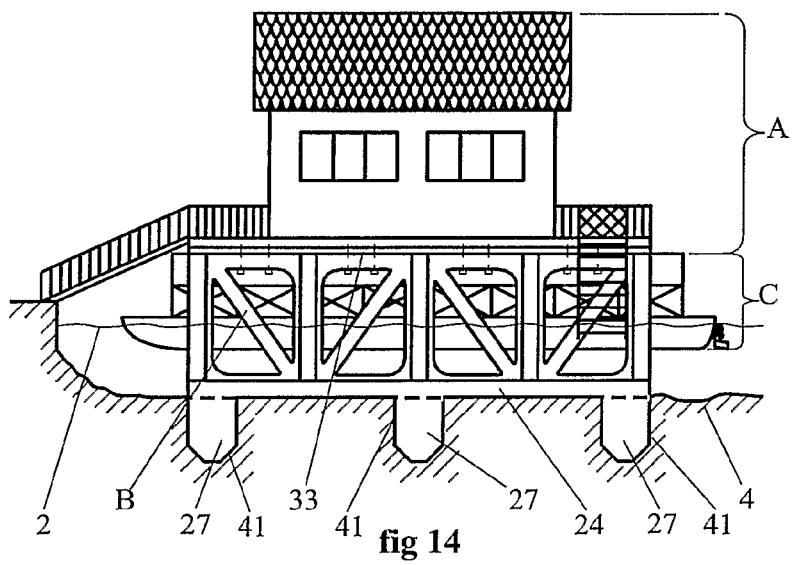
FIG. 14, side view of a building over the water, with foundations for the bottom plate and with sole plates.
Figure 15:
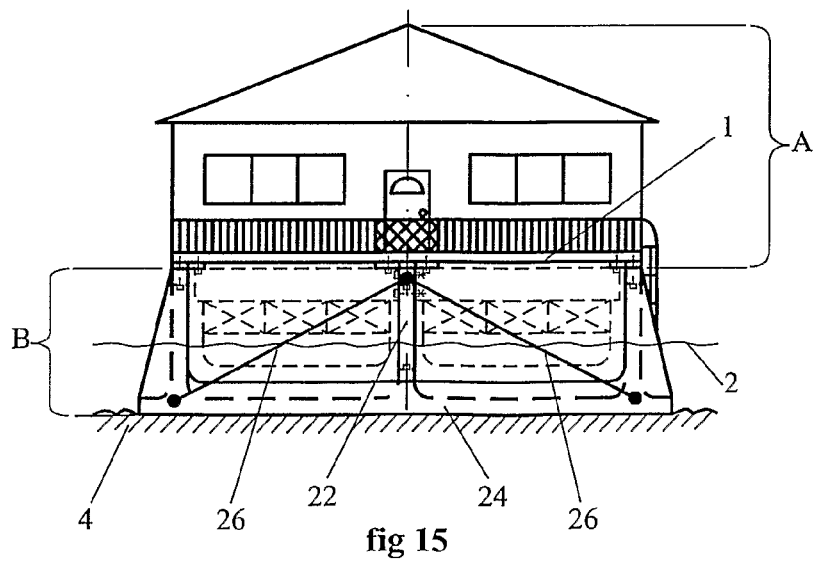
FIG. 15, front view of a building over the water sitting on the ground, with detachable posts and braces.
Figure 16:
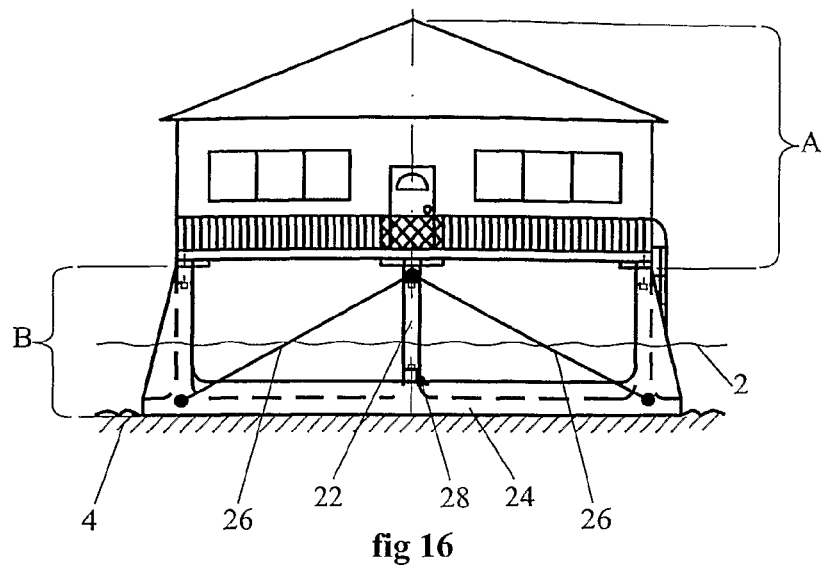
FIG. 16, front view of a building over the water sitting on the ground, with posts that can be hinged and detachable braces, without mobile floating docks.
Figure 17:
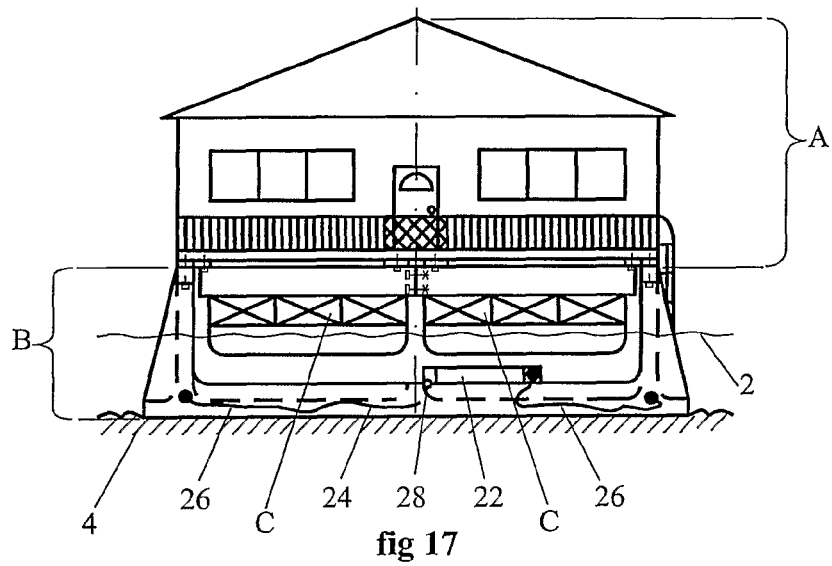
FIG. 17, front view of a building over the water, with hinged posts and detached braces, and with mobile floating docks.
Figure 18:
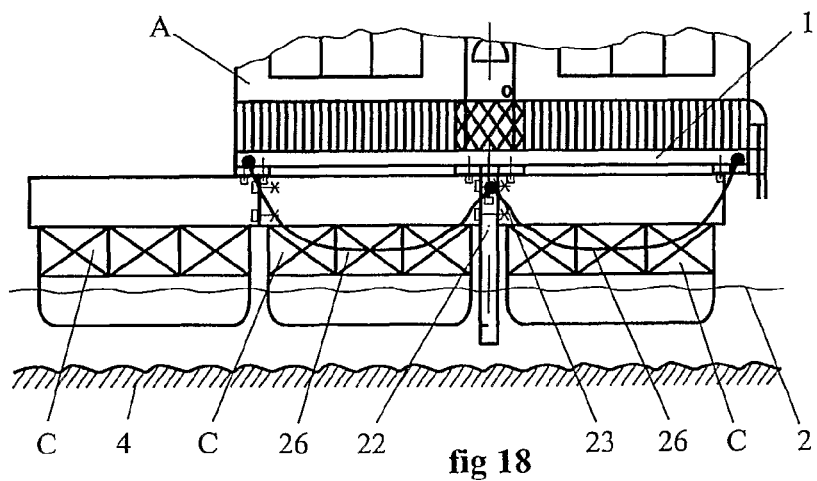
FIG. 18, front view of a building over the water, with detached posts and braces, floating on mobile floating docks and without supports.
Figure 19:
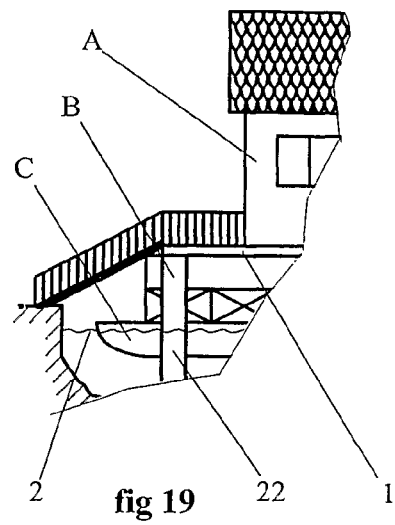
FIG. 19, side view detail of a building over the water, with posts that directly support the superstructure.
Figure 20:
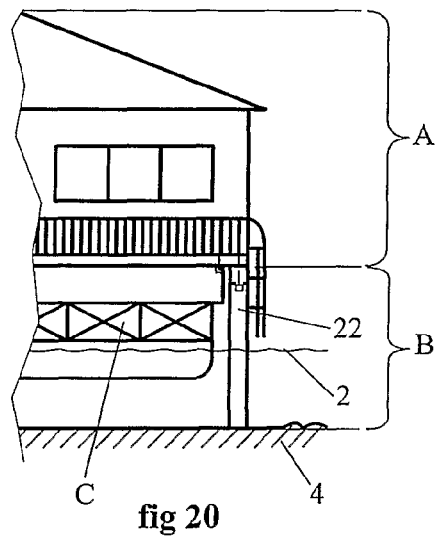
FIG. 20, front view detail of a building over the water, with posts that sit directly on the ground FIG. 21, front view detail of a building over the water, with posts permanently fixed on the ground by means of post foundations.
Figure 21:
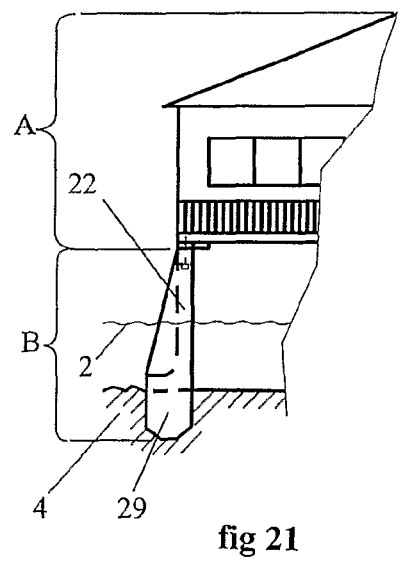
Figure 22:
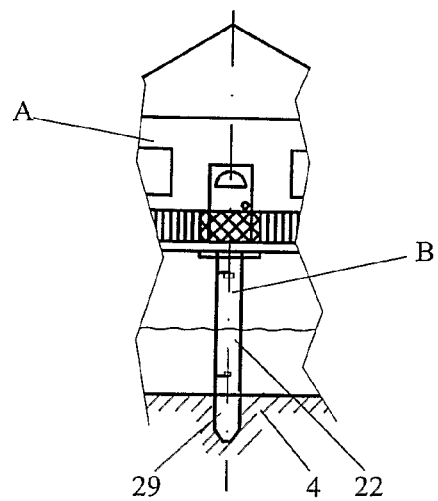
FIG. 22, front view detail of a building over the water, with posts detachably assembled on post foundations.
Figure 23:
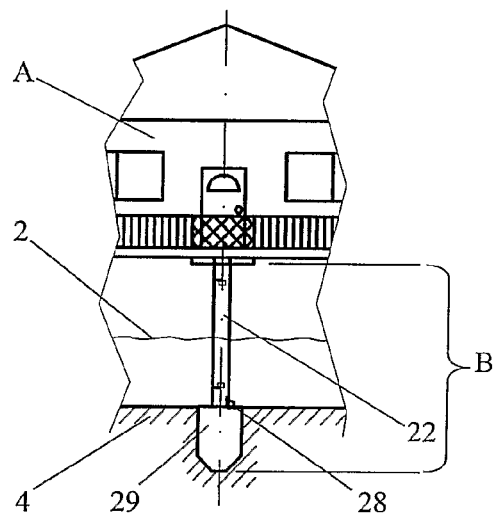
FIG. 23, front view detail of a building over the water, with posts that can be hinged, assembled on post foundations.
Figure 24:
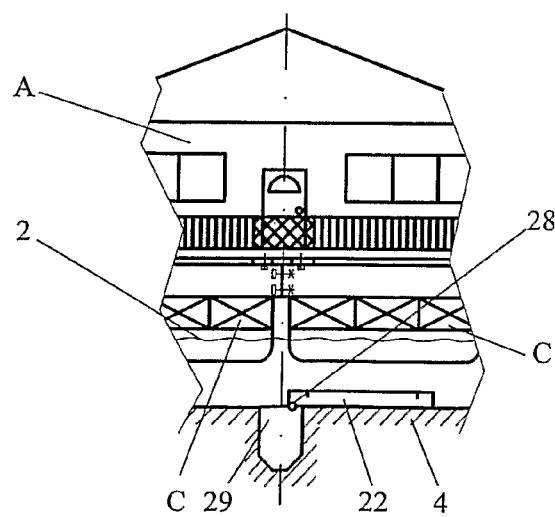
FIG. 24, front view detail of a building over the water, with hinged posts, assembled on post foundations.
Figure 33:
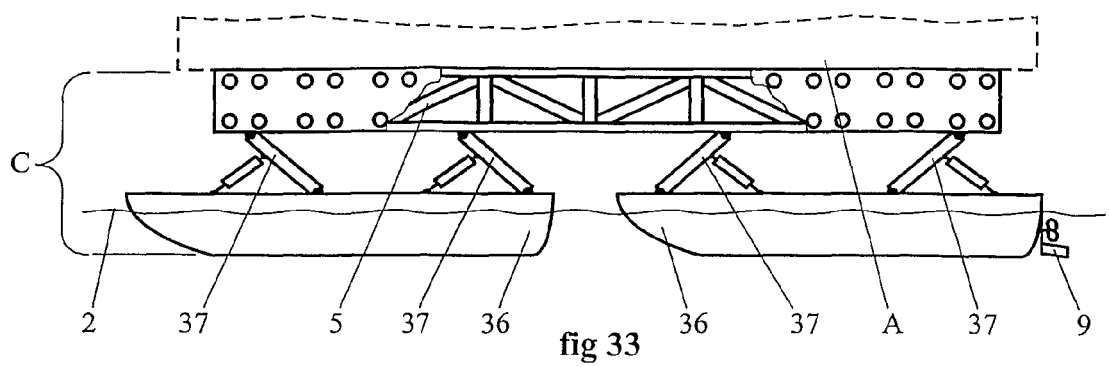
FIG. 33, front view detail of a building over the water with mobile floating docks with mobile floaters.
Figure 34:
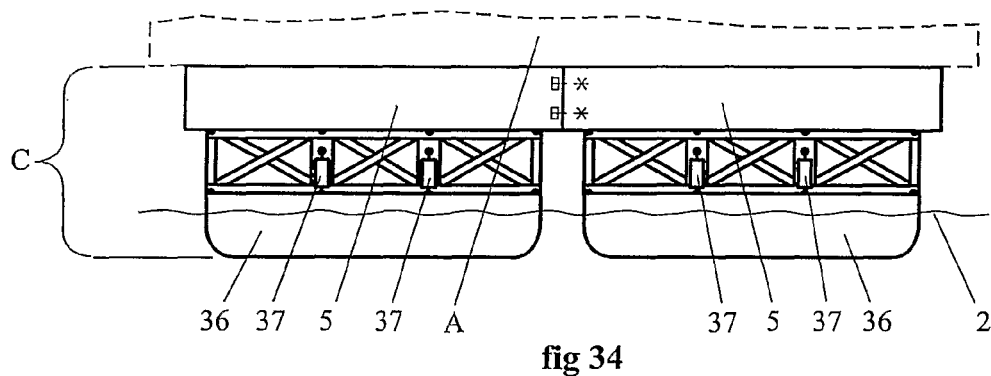
FIG. 34, side view detail of a building over the water with mobile floating docks with mobile floaters.
Figure 37:
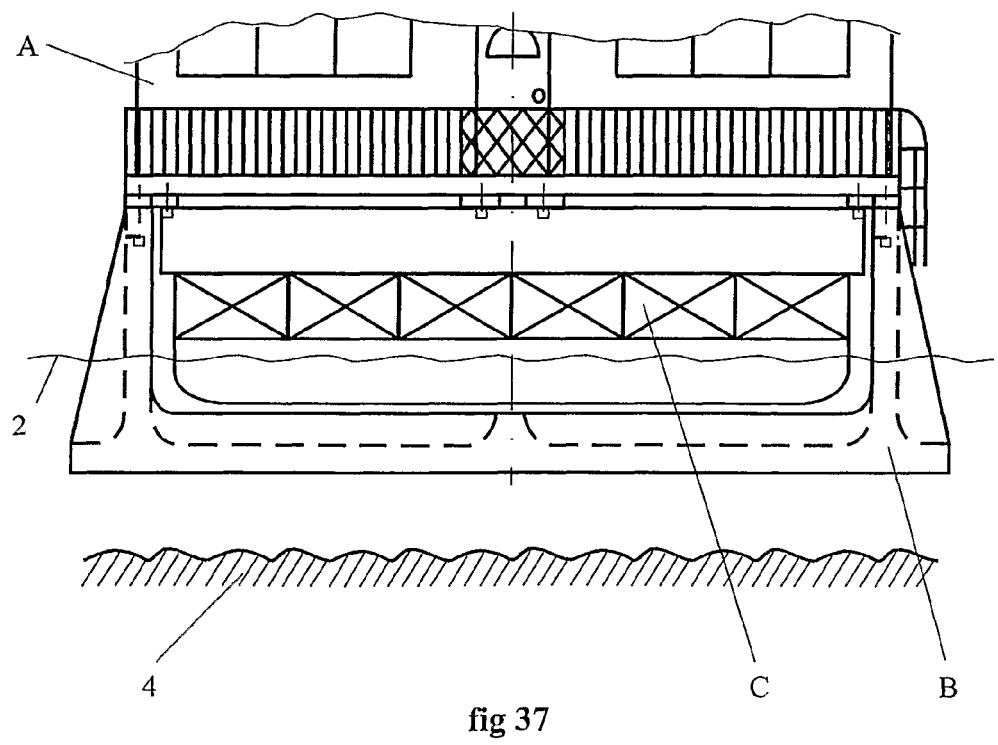
FIG. 37, front view of a building over the water with a single mobile floating dock.
Figure 35:
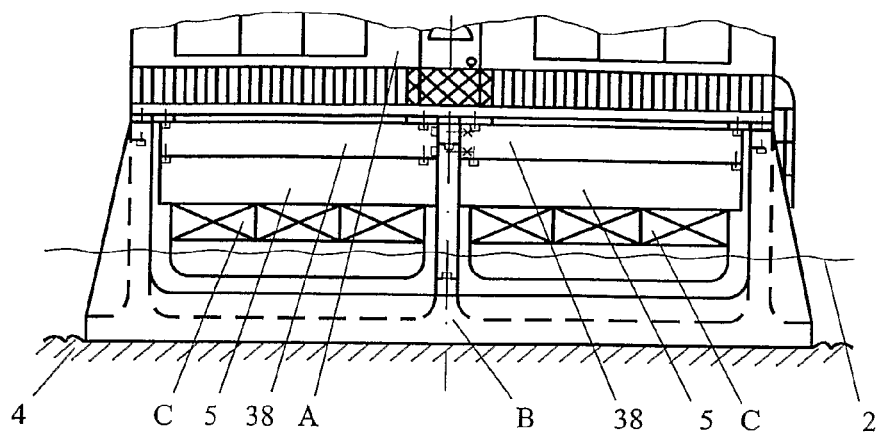
FIG. 35, front view of a building over the water with extension subassemblies.
Figure 36:
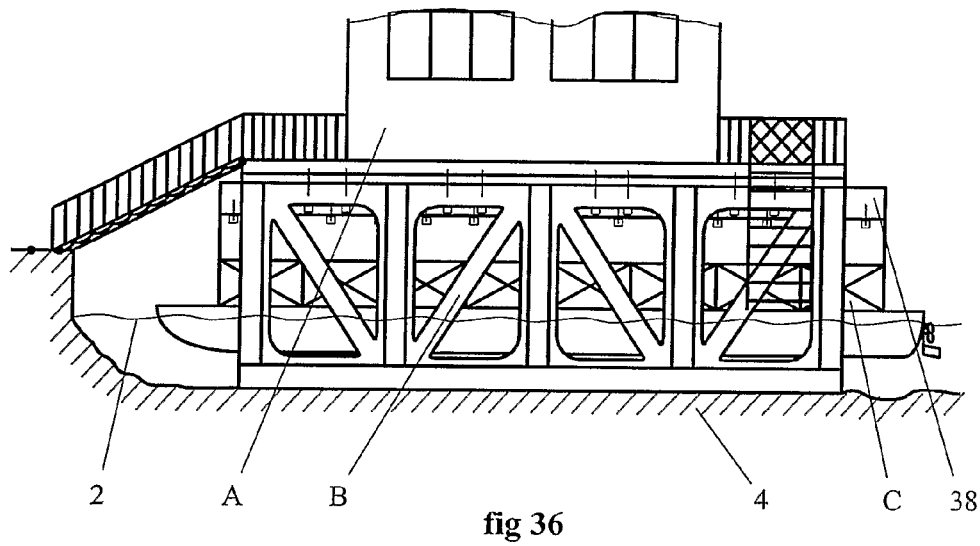
FIG. 36, side view of a building over the water with extension subassemblies.
Figure 38:
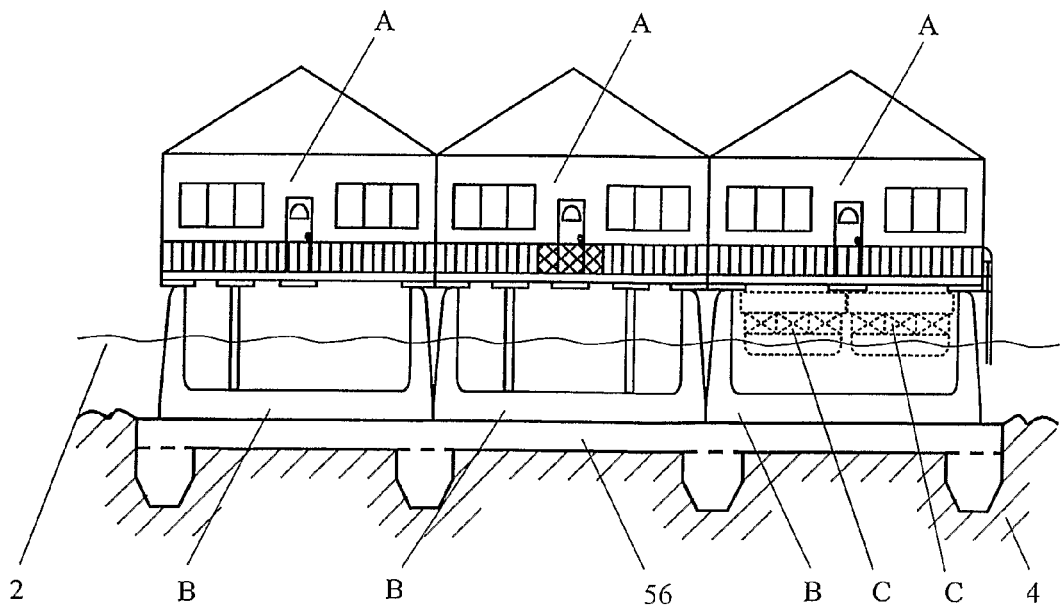
FIG. 38, front view of a group of buildings over the water.
Figure 44:
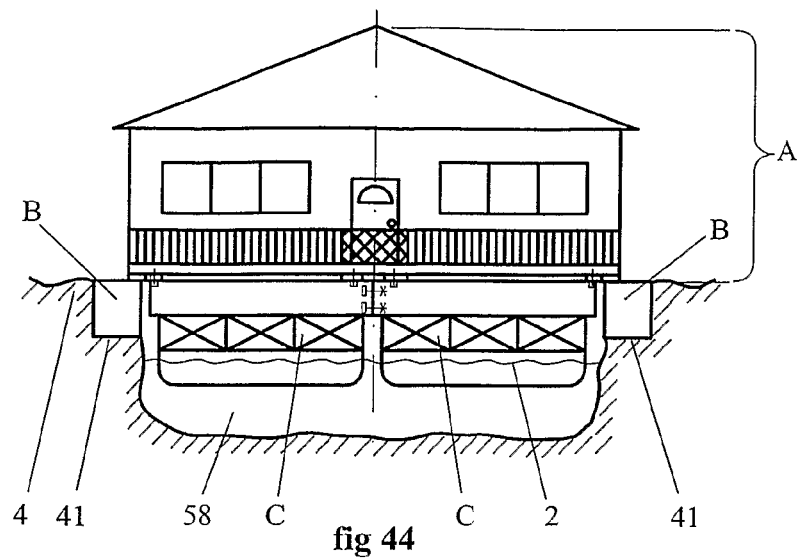
FIG. 44, detail of a hosting site with a canal and front view of a building over the water.
Figure 45:
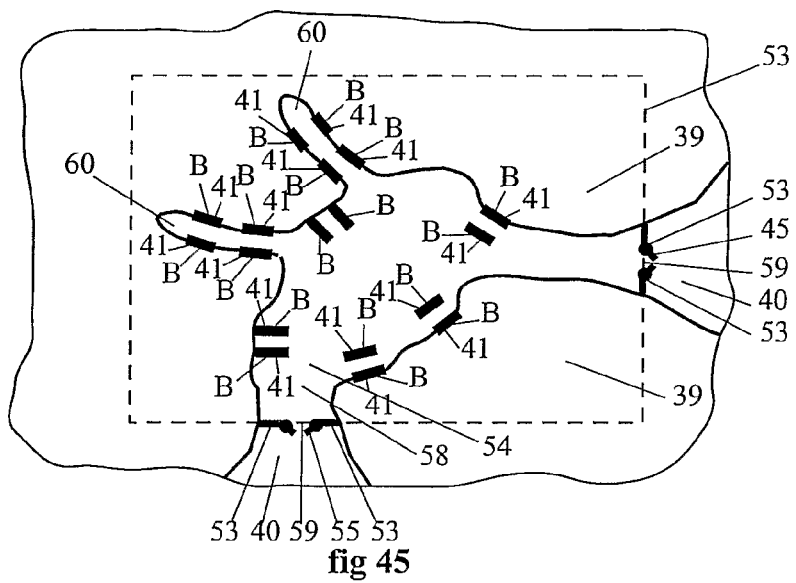
FIG. 45, detail of a hosting site with a canal with multiple ramifications.
Figure 46:
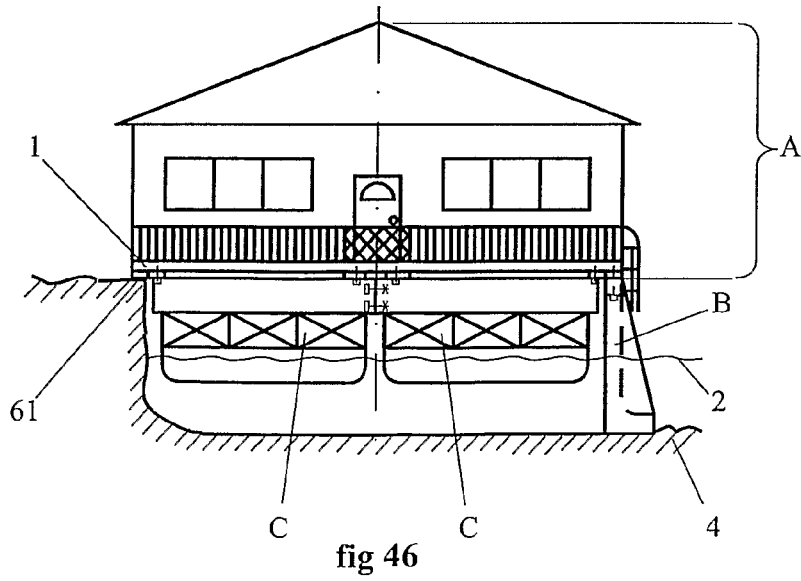
FIG. 46, detail of a hosting site with a sitting surface built above the water on which a building over the water sits directly.

The invention refers to a building over the water, that consists of: a superstructure A provided with at least one of some floor structures 1 that is placed above a water surface 2, and on which an inhabitable subassembly 3 is positioned, at least one of some supports B sitting on ground 4 consisting of the bottom of a navigable body of water and of its shores, the support B being positioned under the floor structure 1, and at least one of some mobile floating docks C with variable and controllable buoyancy. Each dock C is provided with a load carrying platform 5 positioned under the floor structures 1. The superstructure A is sequentially held above the water surface 2 by the supports B, while sitting on the ground 4, and respectively carried by the docks C, while floating, the superstructure A being detachable from the ground 4, and transportable on water on the mobile floating docks C, thus being possible to reposition the superstructure A on ground 4, at a destination of choice.

The supports B are detachably or permanently secured to the floor structures 1. If detachably secured, the superstructure A can be detached from these supports B, and carried while floating on the docks C without the detachable supports B, can be removed from the detached supports B, and can be repositioned on ground 4 directly on shore or by means of the supports B.

The docks C are detachably or permanently secured to the floor structures 1 by means of their platforms 5. The detachably secured docks C can be removed from under the superstructure A that sits on the ground 4 by means of the supports B, or that sits on the shore, and later the removed floating docks C can be repositioned and reattached under the superstructure A.

The floor structures 1 are made of beams, structural or sandwich plates, manufactured similar to the inhabitable subassembly 3, from wood, metal, plastics, composites, or other known materials that can withstand humid environments and water splashing.

The supports B are manufactured from known materials that can withstand immersion and freeze-thaw cycles, like concrete, impregnated wood, metal alloys, and composites.

The platforms 5 are built as the upper part of a caisson, as interconnected trusses, or as any other appropriate structures of high stiffness and strength appropriate to the operating loads they have to withstand. The floating docks C are built of metals, composites or plastics that can withstand repetitive immersion.

The building claimed by the invention, has at least one of some mobile floating docks C that comprises at least one of some floaters 6 secured under the load carrying platform 5, floater 6 that contains at least one of some ballastable chambers 7 that can be flooded with or emptied of water by means of some pumps and of some valves, or by means of compressed air supplied by air compressors and of some valves, the pumps, the compressed air supply and the valves being built in accordance with the known state of the art and not represented on figures. The water level in each chamber 7 is or is not independently adjustable and is or is not automatically adjustable. These adjustments are performed by means of some command and control equipment built in accordance with the known state of the art and not represented on figures. Each floater 6 is rigidly fixed to the appropriate platform 5, thus increasing the rigidity and strength of the dock C.

Each mobile floating dock C is provided with some mechanical guiding subassemblies 8 with variable and real-time adjustable length, used for reducing the impact of the swell, currents, and wind, by guiding the dock C with or without the superstructure A or the supports B attached, while positioning these dock C with regard to the ground 4 or with regard to the supports B that sit on the ground 4, or by guiding the dock C while it is being attached under or detached from a superstructure A. Each guiding subassembly 8 is connected at one end to the dock C by means of an articulation, and, during the guiding operations, is attached at the other end into a detachable articulation built on a structure fixed with regard to the ground 4. The guiding subassemblies 8 are ropes, chains, or cables pulled by winches, or are rams, ball-screws linear actuators, or mechanisms with pulleys, or a combination of these, and the articulations, that are not shown on the figures are implemented by the inherent flexibility of the ropes, chains, or cables that are part of the guiding subassemblies 8, or by the mounting the end of the guiding subassemblies 8 into spherical articulations, or by other constructive configurations made in accordance with the known state of the art.

At least one of the mobile floating docks C is equipped with at least one of some propulsion groups 9, which is used to maneuver the dock C, detached or carrying the superstructure A or the supports B.

In case that the docks C are provided with no propulsion group, the docks C, while carrying or not carrying the superstructure A and the supports B, are maneuvered by tugging, or by pushing.

The superstructure A has its inhabitable subassembly 3 provided with at least one of some inhabitable levels 10 positioned on the floor structures 1, the said level 10 comprising some walls 11 that delimit some rooms 12, upon these levels 10 being placed at least one roof 13. Some windows 14 and some doors 15 are installed in the openings of the walls 11. The inhabitable subassembly 3 can be furnished and provided with heating, ventilation and air conditioning systems, not shown on figures. The inhabitable subassembly 3 is also provided with some decks 16 surrounded by some handrails 17 provided with some access gates 18. For providing the access across the water surface 2, the building over the water is provided with at least one of some removable access bridges 19, and with at least one of some stepladders 20 positioned toward the water surface 2, that lead to the floor structure 1. The superstructure A is also provided with some stairs that interconnect the different inhabitable levels 10, and that are not shown on the figures.

The superstructure A is provided with some electrical, water, sewage, and gas installations and with cable or optical fiber installations for phone/TV/data, not shown on figures, installations that are connected to the appropriate land-based utilities and service providers when available, through at least one of some groups 21 of detachable connectors, and the docks C are provided with on-board electrical generators, fresh water tanks, sewage tanks, natural gas/propane containers, and transceivers for voice and data, not shown on the figures, compatible with the installations of the superstructure A, providing utilities and services that are connected through the same group 21 of detachable connectors. or through other detachable connectors not shown on figures, to the appropriate installations of superstructure A, thus supplying utilities and services when not available from ground.

At least one of the supports B is provided with at least one of some posts 22, that is built vertical or inclined, and that holds the superstructure A by means of at least one of some upper beams 23, the said upper beam 23 being fixed on the posts 22. The posts 22 sit on the ground 4 by means of a bottom plate 24 that makes up the lower part of the support B. The bottom plate 24 is provided with at least one of some lower stiffening ribs 25. The bottom plate 24 is detachable from the ground 4 it sits on, and has mutual compatible assembly capabilities with the ground 4. At least one of the supports B is provided with some braces 26 that can be ribs, diagonals, props, or bracing plates, all said braces 26 increasing the strength of the building over the water.

The building over the water, in another configuration, has at least one of its bottom plates 24 permanently fixed to the ground 4, either by being embedded into the ground 4, or by means of at least one foundation 27 for the bottom plate.

According to the invention, the building over the water has at least one of its posts 22 permanently fixed to the bottom plate 24, in another configuration the building over the water has at least one of its posts 22 detachable from the bottom plate 24, so that this post 22 can be removed from the bottom plate 24, or replaced with items of similar height, and in yet another configuration, at least one of the detachable posts 22 is hinged to the bottom plate 24, by means of at least one of some articulation joints 28 built with known state of the art parts, like for example with some hinges.

Also, according to the invention the building over the water is provided with at least one of its braces 26 that is permanently fixed to its supports B, and in another configuration the building over the water has at least one brace 26 detachably assembled to and removable from the supports B.

The building over the water, in another configuration, has at least one of its supports B, provided with at least one post 22 on which the superstructure A sits directly, the beams 23 being absent.

The building over the water, in another configuration, has at least one of its posts 22 sitting directly on the ground 4.

The building over the water, in another configuration, has at least one of its posts 22 sitting on the ground 4 by means of a post foundation 29 on which the post 22 is permanently fixed, or is detachably assembled. In yet another configuration, at least one of the detachable posts 22 is hinged to the foundation 29 by means of at least one of some articulation joints 28 built with known state of the art parts, like for example with hinges.

In other configurations recommended for positioning the building claimed by the invention on the ground 4 higher than the water surface 2 or on the bottoms of shallow waters, where shorter supports B are required, the said building has at least one of its supports B build with at least one of some support beams 30, or of some support plates 31, the said beams 30 and plates 31 being positioned horizontally, or the said building has at least one of its support B built with at least one of some support blocks 32. The said beams 30, plates 31, and blocks 32 are embedded into the ground 4, either directly or by being attached to some foundations, and are made of wood, plastics, composites, concrete, metal, or other higher strength materials.

The building claimed by the invention has its floor structures 1 placed directly on the supports B, or, in another configuration, by means of some sole plates 33 for support positioning that are components of the superstructure A, and are fixed to the floor structures 1.

In another configuration, the building claimed by the invention, for increasing the height of its floor structures 1 with regard to the ground 4 and to the water surface 2, is provided with some extension beams 34 detachably or permanently secured to the supports B, the floor structures 1 being positioned and detachably secured on the said beams 34. The extension beams 34 are used when necessary to compensate for high water level at the location where the superstructure A sits on the supports B. By using the said extension beams 34 the stiffness of the supports B and of the assembly formed by superstructure A and the supports B can also be increased, and additional access paths for the installations pertaining to the superstructure A are provided.

The building claimed by the invention has the platforms 5 of its docks C attached to the floor structures 1 directly, or, in another configuration, by means of some sole plates 35 for dock positioning that are components of the superstructure A, being fixed to its floor structures 1. The said plates 33 and 35 are made of metal, plastic, composites, impregnated wood-based materials, or of other high strength materials. The adjacent plates 33 and 35 can be joined together.

The building claimed by the invention provided with multiple docks C has the adjacent platforms 5 assembled together, in order to achieve a rigid structure that supports the superstructure A.

These mutual assembled docks C are permanent or detachable, and are directly assembled to each other or, for reducing the loads upon the superstructure A while maneuvering it, they include at least one of the posts 22, upper beams 23, and braces 26 between the adjacent docks C.

In an alternate configuration not shown on the figures, the building claimed by the invention is provided with at least one of the docks C with a floater 6 containing the ballastable chambers 7, the said dock C being built from some reinforced floating caissons having the shape of equal parallelepipeds, floating caissons that form the ballastable chambers 7 and that are assembled to each others using state of the art parts, the upper decks of these assembled caissons being positioned in essentially the same plane and used as the carrying platform 5.

The building claimed by the invention, in an alternate configuration, is provided with at least one mobile floating dock C that comprises at least one of some floaters 36 at least vertically mobile with regard to the appropriate platform 5, the mobility of the floater 36 being achieved by means of at least one of some mechanical subassemblies 37 connecting each floater 36 to the appropriate platform 5, the subassembly 37 being actuated in accordance with the known state of the art, by hydraulic, pneumatic, or electromechanical actuation means, with actuators that include linear rams, rack-and-pinion gear driven jack assemblies, inflatable air-cushions, systems of cables and pulleys and vertical slides, not presented on figures. In this configuration, additional floaters 6 positioned under platforms 5, that contain ballastable chambers 7 can also be present, or can be missing. The actuation of the mechanical subassemblies 37 and the induced movement of the floaters 36 can be automatically or manually controlled, and can be independently controllable or not. These adjustments are performed by means of some command and control equipment built in accordance with the known state of the art and not represented on figures.

The independently adjustable water level in each chamber 7 and the independently controllable movement of each mechanical subassembly 37 allow the structural platform 5 and also the floating superstructures A be positioned horizontally or at the desired inclination, compensating for the unequal loading of some areas of the platforms 5. The automatically adjustable water level in each chamber 7 and the automatically adjustable movement of each mechanical subassembly 37, achieved in accordance with the known state of the art, allow the structural platform 5 and also the floating superstructures A carried thereon to continuously be kept horizontal or at the desired inclination, without human intervention.

In a configuration, when the superstructure A needs to be floatable at low water levels, the building claimed by the invention has its superstructure A sustained by the platforms 5 by means of at least one of some removable extension subassemblies 38, the said subassemblies 38 having a height that is of the same order of magnitude with the draft of the dock C, and being made of some light structures like caissons, beams, legs, or other similar structures that ensure the high strength and stiffness. The use of the subassemblies 38 increases the strength and stiffness of the assembly formed by the superstructure A and the docks C. The subassemblies 38 can be used while stacked one upon another for compensating a much lower water level, and present possibilities of mutual attachment and of attachment to the superstructure A and to the platform 5 that they come into contact. The subassemblies 38 can be maneuvered with the docks C and can be stored on some supports B provided with some interconnection saddles that are similar to the floor structures 1.

The building claimed by the invention can also be provided with only one single dock C.

The assembly or fastening of the supports B onto the ground 4, of the superstructure A onto the supports B, and of the superstructure A onto the docks C, are not mandatory, but they are recommended for avoiding unintended slippage under the influence of earthquakes, of high winds, or of water flow or swell.

If the floor structure 1 is removable from the supports B, the superstructure A can be detached from the ground 4 by the mobile floating dock C and transported on water together with or without the supports B that are not fixed to the ground 4. If the floor structure 1 is built fixed onto the supports B, the superstructure A can be detached from the ground 4 by the mobile floating dock C and transported on water together with the supports B that are not fixed to the ground 4. The building with the superstructure A that is built fixed on at least one of the supports B fixed onto the ground 4, constitutes the object or the invention, if, before being in this fixed configuration, the said superstructure A detached from the ground 4 was carried while floating by at least one of the docks C. The superstructure A transported on the docks C together with some supports B can be positioned at a destination on these supports B, and the superstructure A transported on the docks C without supports B, can be positioned at a destination on some supports B already positioned on ground 4 or directly on ground 4.

Between the floor structures 1 and the supports B or the platforms 5, and between the ground 4 and the supports B, and also on the extensions beams 34 and on the extension subassemblies 38 and on the platform 5 sides, some plastic material or textile strips are attached to dampen the mechanical shocks that can be generated while the docks C are maneuvered with or without the superstructure A or the supports B attached., the said strips not being represented on figures.

All assembly, securing, assembly capabilities and the configurations that are removable or hinged, related to the supports B, superstructure A, docks C, their components, and the ground 4, are implemented using state of the art parts, not shown on figures. Also the final positioning of the docks C with regard to the superstructure A, of the superstructure A with regard to the supports B and of the supports B with regard to the ground 4 are implemented using state of the art parts, not shown on figures.

Thus, it is possible although not always required, to erect a building over the water, connected onto the ground 4, consisting of the superstructure A assembled on supports B attached onto the ground 4, the said building being as strong as a land based building that can withstand earthquakes of at least magnitude 9 on Richter scale, and storms with winds of at least 250 km/hour.

Also it is possible, although not always required, to put together a floating building over the water, consisting of the superstructure A assembled on docks C and with supports B attached, or without supports B, the said building being able to navigate on open seas under winds of over 74 km/hour and on four meter high swell.

However, the building claimed by the invention can be imposed certain maneuvering restrictions, like floating only on fair weather, equivalent to floating on protected waters, with waves of up to 0.5 meters high and wind speed of up to 28 km/hour, and the active load on the superstructure A while floating can also be restricted to much lower limits compared to the allowable loads for the superstructure A sitting on ground 4, the required strength and stiffness of the said building being as a consequence reduced. Also the said building can be made to float only occasionally, for demonstration, or relocation, the building configuration being similar to the one for land-based buildings, with large sizes and with diverse and non-aerodynamic shapes, with many levels, as a result the said building being less expensive and much more comfortable and roomier than a ship.

The building claimed by the invention offers the flexibility of usage found in both land-based buildings and in ships, and the said building can be positioned on the bottom of water and can navigate on lakes, rivers, and, with some precautions, on seas and oceans, ensuring comfortable and flexible living conditions that make it fit as dwelling, fit for tourism, recreation, research activities, and also fit for commercial or military usage. The buildings over the water are made in various sizes, lay-outs and levels of comfort similar to those offered by the land-based buildings, in contrast with the ones offered by the small and crowded cabins available on ships. The buildings claimed by the invention can be used as primary or secondary residences, sitting on ground or floating, or as commercial buildings like hotels, restaurants, casinos, conference halls, shopping areas, offices, fishing cabins, traveling floating exhibitions, including model houses or historic monument replicas, or other architectural replicas, or can be used to meet other purposes, such as military bases or installations, when the necessary armor and protection is provided, and as bases for research and exploration, manufacturing areas, or any other appropriate usage. The buildings over the water, solitary or in groups, can be inserted in just a few hours and used for long periods of time in different environments like waterways, coastal areas, crowded areas in cities, fragile ecosystems, aggressive environments, areas with no land access, war theaters, and can also be removed or repositioned in a few hours, with minimal effort and impact, when their presence is no longer required.

The building claimed by the invention involves an economical operation due its modularity and mobility. The superstructures A together with the supports B are build like the light-structured land-based buildings, preferably in dedicated shops, using mainly standard land-based building materials, processes and procedures, and seldom using marine-class materials and procedures, after erection, the said superstructures A being shipped with the help of the floating docks C on water to the operational sites. Also the modularity of the buildings over the water allows a large number of superstructures A to float by using a small number of removable mobile floating docks C, thus, the cost of using just one set of dock C for transporting a multitude of superstructures A being low.

The group of buildings claimed by the invention comprises at least two superstructures A positioned next to each other, on at least one of some supports B standing on the ground 4, each of the superstructure A being permanently fixed or detachably assembled to the at least one of the neighboring superstructure A using state of the art assembly elements. The superstructures A are sequentially carried and transported over the water surface 2 by the docks C, with or without supports B attached, as part of a building over the water before or after being incorporated into a group of buildings, or after being separated from the neighboring superstructures A and from the supports B that are not transported. If multiple supports B are used as part of the group of buildings, these supports B can be permanently fixed or detachably assembled to each other. The group of buildings claimed by the invention is used as a specific construction that can change its location, having integrated functionality and larger sizes, like larger dwelling, concert or meeting hall, show room, museum, religious edifice, historical monument or large architectural replica, palace, larger hotel, and military base. During the transportation on water of the separated superstructures A part of a group of buildings claimed by the invention, the said superstructures A can be stiffened as required with braces not shown on the figures.

The maneuvering method of the buildings over the water, consists of the following operational phases that can be implemented with people on-board, taking into account the weather, the water movement, and the swell, and that can also be implemented in part, or in a different order, that can be merged as a whole or in part into other operational procedures, or that can be repeated. The implementation of the maneuvering method starts from a configuration of the building over the water with the superstructure A held above the water surface 2 by the supports B, and with the detachable docks C removed from under the superstructure A.

The floating docks C are positioned under the superstructure A and are attached thereto. To implement this phase, the docks C are brought by their own propulsion or by tugging or pushing, under the superstructure A, their platforms 5 are guided and lifted till they touch the floor structures 1, the buoyancy of the docks C is increased without detaching the superstructure A from ground 4, in the mean time removing the detachable or hinged posts 22 or braces 26 and other interfering objects from the path of the said dock C, the platforms 5 being attached to the floor structures 1 and to the adjacent platforms 5, if present. At the end of this operational phase, the persons, materials, equipment and vehicles that are to be transported to the destination are loaded into and onto the superstructure A, all free-moving objects being clamped down, lest they slide or tumble while the superstructure A floats, the ground services and the utilities are disconnected from the group 21 of detachable connectors, the installations of the superstructure A are connected to the service and utilities supplied by the docks C, and all access bridges 19 and connections of the superstructure A to objects that are directly or indirectly fixed to the ground 4, hindering the mobility of the superstructure A, are removed.

The superstructure A is detached from ground 4 and from any structure fixed thereto, being carried by the docks C, while floating. The superstructure A is detached from ground 4 with or without the supports B that hold the said superstructure A, by increasing the buoyancy of the docks C, and then by lifting the load carrying platforms 5, while guiding the docks C, at the guidance completion, the guiding subassembly 8 being detached from any direct or indirect connection to the ground 4.

The superstructure A, carried by the mobile floating docks C, is transported to the desired destination, the said docks C being moved by their own propulsion groups 9 or by tugging or pushing.

At the said destination, the superstructure A is positioned onto supports B in contact with ground 4. This positioning is implemented by using the supports B transported attached to the superstructure A or by using other supports that have been already positioned on the ground 4, the platforms 5 together with the superstructure A that they carry, being moved down and guided with the guiding subassemblies 8. After the said superstructure A is positioned, the access bridges 19 are repositioned, and the connections with other structures fixed to the ground 4 are made as required, the persons, materials, equipment and vehicles transported are removed from the superstructure A, the objects that have been clamped down while floating are freed, the utilities and services supplied by the docks C to the superstructure A are disconnected and the utilities and services supplied from ground are connecting by means of the group 21 of detachable connectors.

The docks C are detached from beneath the superstructure A and are moved away. For implementing this operational phase, the platforms 5 are moved down while being guided. At the same time, the detachable or hinged posts 22 or braces 26 are repositioned for supporting the superstructure A, thus finalizing the maneuvering method.

The docks C that have been moved away can then be used for other transports.

If initially the docks C have not been removed, the operational phase of positioning and attaching the docks C under the superstructure C is not applicable. If the docks C are not removable the operational phases of positioning and attaching the docks C under the superstructure C, and of detaching the docks C from under the superstructure A and moving them away are not applicable.

The guiding of the docks C is implemented by the controlled variation of the length of the guiding subassemblies 8 and by controlled lifting and moving down of the platforms 5. For the docks C with floaters 6 and ballastable chambers 7, the lifting of the structural platforms 5 together with the items carried thereon, or the increase in the dock C buoyancy are implemented by emptying the chambers 7 of water, and the moving down of the structural platforms 5, together with the items carried thereon, or the reduction of dock C buoyancy are implemented by flooding the chambers 7. For the docks C with vertically mobile floaters 36, the lifting of the structural platforms 5 together with the items carried thereon, or the increase in the dock C buoyancy are implemented by moving down the floaters 36 with regard to the structural platforms 5 by means of the mechanical subassemblies 37, and the moving down of the structural platforms 5, together with the items carried thereon, or the reduction of dock C buoyancy are implemented by lifting the floaters 36 with regard to the structural platforms 5 by means of the mechanical subassemblies 37.

The invention refers to buildings over the water of different sizes, weights and configurations.

A specific configuration of a small size building over the water, claimed by the invention, follows. The said building is provided with an inhabitable subassembly 3 consisting of a single inhabitable level 10, with the number of the inhabitable levels 10 being easily upgraded to up to three levels built one above another, the superstructure A being 6-12 meter wide, and maximum 24 meter long. At this size the superstructure A shall weigh less than 500 kgf per square meter, and shall have a total weight of less than a 100 metric tons.

The inhabitable level 10 positioned on the floor structures 1 comprises the walls 11 that delimit the rooms 12, being also provided with a roof 13. The windows 14 and the doors 15 are installed in the openings of the walls 11. The inhabitable subassembly 3 can be furnished and is provided with heating, ventilation and air conditioning systems.

The superstructure A is also provided with electrical, water, sewage, and gas installations and with cable or optical fiber installations for phone/TV/data, installations that are connected to the appropriate land-based utilities and service using a group 21 of detachable connectors, and also connectable to the utilities and services supplied on-board of the docks C when not available from ground.

The inhabitable subassembly 3 also comprises some decks 16 surrounded by some handrails 17 provided with some access gates 18. For providing the access across the water surface 2, the building over the water is provided with a removable access bridge 19, and with a stepladder 20 positioned toward the water surface 2, with the bridge 19 and the stepladder 20 leading onto the floor structure 1.

The superstructure A is sequentially held above the water surface 2 by the support B, while sitting on the ground 4, respectively carried by the docks C, while floating. The floor structure 1 of the A superstructure sits directly on the upper beams 23 that are fixed to the posts 22, both of a rectangular shape, the posts 22 sitting on the ground 4 by means of the bottom plate 24 provided with lower stiffening ribs 25 and with assembly capabilities to the ground 4, the support B also being provided with braces 26 shaped like diagonals and also like props. The direct placement of the floor structure 1 of the superstructure A on the beams 23 can be replaced with the placement of the said floor structure 1 by means of the sole plates 33 for support positioning. In its median plane, the support B has some removable posts 22 assembled on the bottom plate 24, the said posts 22 being removed lest they interfere with the docks C when the said docks C are positioned under the superstructure A, the said posts 22 being repositioned to hold the superstructure A when the docks C are removed. The support B is tall enough to ensure that the superstructure A will not be flooded at the highest water level 2 and swell. However, if the water level 2 and swell increase beyond the acceptable limits, the extension beams 34 are used, being detachably assembled on the beams 23 of the support B on which the floor structure 1 is attached.

The building claimed by the invention has two mobile floating docks C, but in other configurations the number of docks C can be different, like one, three, or four. The adjacent docks C have their load carrying platforms 5 directly assembled under the floor structure 1, and also, for achieving a rigid structure that supports the superstructure A, have the said adjacent platforms 5 directly assembled to each other. The direct assembly of the platforms 5 to the floor structure 5 can be replace by assembly by means of the sole plates 35 for dock positioning, and the mutual direct assembly of the adjacent platforms 5 can be replaced with assembly with posts 22, upper beams 23, and braces 26 incorporated in between the said platforms 5. Each dock C is provided with a floater 6 fixed under the load carrying platform 5, the said floater 6 containing some ballastable chambers 7 that can be flooded with or emptied of water by means of some pumps and of some valves, the water level in each chamber 7 being automatically and independently adjusted by means of some command and control equipment, the pumps having a large enough debit to flood or empty the chambers 7 in less than an hour. The said docks C built with the floaters 7 can be replaced by docks C built with vertically mobile floaters 36 actuated by mechanical subassemblies 37 that connect the floaters 36 to the platforms 5. The docks C are approximately as long as the superstructure A, both being less than 24 meters long. The docks C also have a width of approximately 3 to 6 meters equal to the width of the superstructure A divided by the number of dock, the said docks also having a draft of about one meter, and a vertical size of the floaters 6 of about two meters, the minimum water depth for maneuvering being approximately equal to the vertical size of the floaters 6. Thus the docks C can be removed from and repositioned under the superstructure A held by the support B, can detach the superstructure A with or without the support B attached, from the ground 4, and can transport the superstructure A and relocate it onto ground 4, directly or by means of the support B, to the desired destination. The docks C are provided with the mechanical guiding subassemblies 8 consisting of winches that are used to guide the docks C when they are attached or detached from structures that are fixed with regard to the ground 4. When required to make the superstructure A float using the docks C, at locations where the water level is low, the superstructure A is carried by the platforms 5 by means of the removable extension subassemblies 38. Each docks C is also provided with a propulsion group 9 used to maneuver the dock C and to make it travel on water.

The large size buildings over the water are very different from the small ones. Although the said buildings consist of light structures that, by using up-to-date materials can simulate any architectural style or finishing requirement, it is not advisable that these large structures be transported in one piece. It is advisable that the said large size buildings be built as a group of buildings, each component of the group being much smaller than the group itself and being individually transported, positioned on ground 4 near each other and assembled together for erecting the large size building over the water. The large size buildings over the water can weigh more than a metric ton per square meter, and their total weight can reach a few thousand metric tons, thus requiring docks C with drafts exceeding two meters. It should be mentioned that the upper limits for the dimensions and weights of the buildings over the water are much larger and similar to the dimensional and weight limits for large ships or offshore oil drilling platforms, meaning hundreds of meters and hundreds of thousands of tons.

The buildings over the water travel at low speed, usually under 36 km/hour, and, although they can travel on any body of water where they do not touch the bottom, the high swell, strong water flow, water falls and white water areas, or strong winds, are avoided, mainly due to the induced lack of comfort and then due to the limits in structural strength and floating stability. However the buildings over the water can safely sit on the water bottoms in strong streams or eddies, in high winds, or above water falls or white water areas, and can also station in tidal areas on shores or above dry water beds.

The hosting site for the buildings over the water, as claimed by the invention, is placed on a shore area 39 and on part of an adjacent navigable water body 40 where the docks C that carry superstructures A and supports B can float, on the ground 4 of the said hosting site being provided at least one of some sitting surfaces 41, on which at least one of some supports B sits, and upon which at least one superstructure A is positioned, the superstructure A being also sequentially carried by at least one of some mobile floating docks C, so that hosting site claimed by the invention hosts at least a building 42 over the water claimed by the invention. The sitting surfaces 41 are built at the desired location with regard to the shore area 39, and are positioned with regard to the water surface 2, so that the superstructures A located above them are accessible, maneuverable with the docks C, and also protected from flooding. The sitting surfaces 41 are built by adding crushed rocks and sand onto the ground 4 or by removing part of soil from ground 4, and are leveled and impregnated with a binder like cement and water or other water resistant binding materials, on the sitting surfaces 41 being provided state of the art clamping elements compatible with the assembly elements of the supports B. The sitting surfaces 41 can also be prepared for the foundations of the supports B.

The hosting site claimed by the invention is provided with at least one of some utilities and services, like electrical and water supplies, sewage, gas supplies, and with cable or optical fiber installations for phone/TV/data, these utilities and services being connected to the installations of the hosted superstructures A using the available groups 21 of detachable connectors.

The hosting site claimed by the invention is also provided with at least one of some maintenance and overhaul areas 43, partially or completely covered by water, where the buildings over the water claimed by the invention and their subassemblies are maneuvered maintained and overhauled, with some pedestrian access paths 44 leading to the sitting surfaces 41 and with some vehicle access paths 45 leading to the same said surfaces 41, with some parking places 46 located close to each surface 41 and used for the vehicles that transport people, hardware, and materials to the said sitting surfaces 41, with some storage sheds and garages 47 positioned close to the surfaces 41 and used for the said vehicles, hardware and materials, with some main access roads 48 connected to the said access paths 44 and 45 and to at least one of the access point 49 onto the hosting site, with some offices 50, and with some commercial areas 51 that serve the hosting site.

The hosting site claimed by the invention has at least one of its sitting surfaces 41 provided with at least one of some supports B on which at least two superstructures A are positioned next to each other, each of the superstructure A being assembled to the neighboring superstructure A with state of the art items, the superstructures A being transportable on water with the help of the mobile floating docks C as part of a building over the water, thus positioning a group 52 of buildings claimed by the invention on the said hosting site.

The hosting site claimed by the invention is provided with at least one of some partially submersed constructions 53, like fences, walls, dams, or breakwaters, that separates at least one of some sections 54 of the navigable water body 40 from the rest of the water body 40, on the said section 54 being located at least one of the sitting surfaces 41. The construction 53 is used to control the access on or from the section 54, and is provided with at least one of some gates 55 built in the water, that allows the access of the docks C and of the carried-on superstructures A and supports B to and from the sitting surfaces 41 located on section 51. The constructions 53 are watertight and the gates 55 are also watertight when closed, so that the level and the physical and chemical characteristics of the water on at least one side of the construction 53 can be independently controlled, in an alternate configuration at least one of the constructions 53 or of the gates 55 being water permeable.

In an alternate configuration, the hosting site claimed by the invention has at least one of its sitting surfaces 41 built using at least one of some bottom platform 56 built as a structural plate, beam, or block, on the upper surface of the said bottom platform 56 being positioned at least one support B, the bottom platform 56 being provided with state of the art clamping elements compatible with the assembly elements of the supports B, and the said bottom platform 56 being also fixed into the ground 4 directly, or by means of at least one of some bottom platform foundations. The bottom platforms 56 are built of concrete, metal, impregnated wood, composites, or other water resistant materials.

In an alternate configuration, the hosting site claimed by the invention has at least one of its sitting surfaces 41 built using at least one of some positioning blocks 57, each block 57 being built as a structure with its height of same magnitude as the average draft of the docks C, on the said blocks 57 being positioned and assembled at least one of the supports B, the said blocks 57 being provided with state of the art clamping elements compatible with the assembly elements of the supports B, and also being detachably assembled to ground 4. Each block 57 is built using materials similar to the ones used for building the supports B. The positioning blocks B are used when necessary to compensate for the high water level at the location of the superstructure A held by the supports B. The blocks 57 can be stacked upon the bottom platform 56. The blocks 57 can also be stacked upon each other to compensate for higher water level. The blocks 57, the detached supports B, and also the bottom platforms 56 not yet fixed into the ground 4, are maneuvered with the docks C on which they are attached with ropes, chains, or adapting saddles similar to the floor structures 1, and are stored on the sitting surfaces 41 or directly on the natural ground 4.

In an alternate configuration, the hosting site claimed by the invention is provided with at least one of some navigable canals 58 built with at least one of some navigable connection 59 to the navigable water body 40 located beyond the canals 58, the ground 4 consisting of the shores and bottom of the canals 59, being provided with at least one of the sitting surfaces 41 on which at least one of some supports B sits, upon the said supports B at least one of some superstructures A being positioned, the said superstructure A being also sequentially carried by at least one of some mobile floating docks C, thus, being possible to maneuver superstructures A on the canals 58 using the docks C, for placing them on the ground 4 with the help of the supports B, or for detaching them from ground 4 and transporting them on water. In an alternate configuration, the hosting site claimed by the invention is provided with multiple navigable connections to the navigable water body 40, and at least one of some navigable canals 58 has multiple ramifications 60 on which the supports B are maneuvered and positioned, on the said supports B being positioned superstructures A.

The said hosting site with at least one canal 58 can also be built with partially submersed constructions 53 and gates 55 that close a part of the canal 58 that includes at least one sitting surface 41 on which some supports B are positioned, the said constructions 53 and gates 55 being watertight so that level and the physical and chemical characteristics of the water inside the closed part of the canal 58 can be independently controlled form the outside water body 40.

In an alternate configuration, the hosting site claimed by the invention is places on a shore area 39 and on part of an adjacent navigable water body 40 where the docks C that carry superstructures A and supports B can float, on the ground 4 of the said hosting site, being provided at least one of some sitting surfaces 61 built above the water at a height equal to that of the supports B sitting on ground 4, on this sitting surface 61 the superstructures A being positioned directly, without supports B, the said superstructures A being transportable on water on the mobile floating docks C. The sitting surfaces 61 are built at locations and using criteria and methods similar to the ones for the sitting surfaces 41.

The superstructures A supported on the floating docks C, with or without supports B attached, are guided with regard to the sitting surfaces 41 and 61 using mechanical guiding subassemblies 8, the final positioning of the said superstructures A being achieved with state of the art items, like guide pins or stops, items that are not shown on the figures.

The hosting sites claimed by the invention are of a large variety, and the operational procedures and the cooperation capabilities among different sites are also diverse. They can provide access with minimal ecological impact into the coastal areas and in shallow waters, otherwise difficult to inhabit despite their beauty and value, and they can also help towards the improvement of these areas, including their ecological value, by using part of the operational income for this purpose.

The simplest hosting sites host a single building over water used, for example, as a guesthouse, and located near a conventional land based dwelling on shore.

The commercial hosting sites harbor hundreds or thousand of buildings over water being similar to the recreational vehicles (RV) parks that are partially situated over the water. The said commercial hosting sites connected by navigable waterways to open seas can be organized as operational networks, in such a way that a superstructure A can be placed on a hosting site at higher latitudes during the summer, and can be placed on a hosting site situated in an equatorial or tropical region during the winter. Using a superstructure A transported on the mobile floating dock C, and hosting sites in different regions on the globe, allows a group of persons to travel and live all over the world without leaving the comfort of their own home.

The hosting sites dedicated to groups 52 of constructions have specific configurations in accordance with their functionality.

What is claimed as invention is:

1. A building over the water comprising:
   a superstructure located entirely above the surface of the water, the superstructure configured to be an inhabitable structure provided with at least one floor structure;
   at least one support detachably secured to the superstructure, the support-positioned directly under the floor structure and adapted to sit on the ground and extend above the surface of the water in order to hold the superstructure above the surface of the water in a first fixed position; and
   at least one mobile floating dock with variable and controllable buoyancy, partially immersed and extending above the surface of the water and being detachably positioned under the floor structures in the first fixed position, the mobile floating dock independent from and having no contact with the support and no contact with the ground,
   wherein in a second traveling position the supports are detached from the superstructure so that the superstructure is detached from the ground, the superstructure is subsequently held above the surface of the water by the mobile floating docks so that the superstructure is thereby transportable on water on the mobile floating docks.

2. The building according to claim 1 wherein that at least one of the mobile floating docks is detachable from the floor structures and is removed from under the superstructure that sits on the ground in the first fixed position.

3. The building according to claim 1 wherein at least one of the mobile floating docks comprises at least one floater secured under the superstructure, the floater containing at least one ballastable chambers that can be flooded with or emptied of water.

4. The building according to claim 3 wherein the water level in at least one of the chambers is independently adjustable.

5. The building according to claim 3 wherein the water level in at least one of the chambers is automatically adjustable.

6. The building according to claim 3 wherein at least one of the docks is built from some reinforced floating caissons that form the ballastable chambers, these caissons being assembled to each others, the upper decks of these reinforced upper caissons being used as a carrying platform.

7. The building according to claim 3 wherein the floaters are secured under the superstructure by a load carrying platform interposed between the superstructure and the floaters.

8. The building according to claim 1 wherein at least one of the docks provided with some mechanical guiding subassemblies with variable and real-time adjustable length, connected at one end to the dock by means of an articulation, and, during the guiding operations, attached at the other end into a detachable articulation built on a structure fixed with regard to the ground.

9. The building according to claim 1 wherein at least one of the docks is equipped with at least one propulsion groups.

10. The building according to claim 1 wherein the superstructure is provided with at least one inhabitable levels positioned on the floor structures, the level comprising some walls that delimit some rooms, upon these levels being placed at least one roof, some windows and some doors being installed in the openings of the walls, the inhabitable subassembly being furnished and provided with heating, ventilation and air conditioning systems, the inhabitable subassembly being also provided with some decks surrounded by some handrails provided with some access gates and with at least one of some removable access bridges, and with at least one stepladders positioned toward the water surface, that lead to the floor structure.

11. The building according to claim 1 wherein the superstructure is provided with some electrical, water, sewage, and gas installations and with cable or optical fiber installations for phone/TV/data, connected to the appropriate land-based utilities and service providers when available, through at least one of some groups of detachable connectors, and the docks are provided with on-board electrical generators, fresh water tanks, sewage tanks, natural gas/propane containers, and transceivers for voice and data, compatible with the installations of the superstructure, providing utilities and services that are connected through the same group of detachable connectors, or through other detachable connectors, to the appropriate installations of superstructure, thus supplying utilities and services when not available from ground.

12. The building according to claim 1 wherein at least one of the supports is provided with at least one post.

13. The building according to claim 12 wherein at least one of the posts holds the superstructure by at least one upper beams fixed on the posts.

14. The building according to claim 12 wherein at least one of the posts sits on the ground by means of a bottom plate.

15. The building according to claim 14 wherein at least one of the bottom plates is provided with assembly capabilities to the ground.

16. The building according to claim 14 wherein at least one of the bottom plates is permanently fixed to the ground.

17. The building according to claim 14 wherein at least one of the posts is permanently fixed to the bottom plate.

18. The building according to claim 14 wherein at least one of the posts is detachable from the bottom plate.

19. The building according to claim 18 wherein at least one of the detachable posts is hinged to the bottom plate by means of at least one of some articulation joints.

20. The building according to claim 12 wherein at least one of the supports, provided with at least one post on which the superstructure sits directly.

21. The building according to claim 12 wherein at least one of the posts sits directly on the ground.

22. The building according to claim 12 wherein at least one of the posts sits on the ground on at least one post foundation.

23. The building according to claim 22 wherein at least one of the posts is permanently fixed on the post foundations.

24. The building according to claim 22 wherein at least one of its posts is detachably assembled on the post foundations.

25. The building according to claim 24 wherein at least one of the detachable posts is hinged to the foundation by at least one articulation joints.

26. The building according to claim 1 wherein at least one of the supports is provided with some braces.

27. The building according to claim 26 wherein at least one of brace is permanently fixed to the supports.

28. The building according to claim 26 wherein at least one brace is detachably assembled to and removable from the supports.

29. The building according to claim 1 wherein at least one of the supports is built with at least one support beam embedded into the ground.

30. The building according to claim 1 wherein at least one of the supports is built with at least one support plates embedded into the ground.

31. The building according to claim 1 wherein at least one of the supports is built with at least one support blocks embedded into the ground.

32. The building according to claim 1 wherein at least one of the floor structures is placed on the supports by sole plates for support positioning.

33. The building according to claim 1 further provided with at least one extension beam secured to the supports, on which the floor structures is positioned.

34. The building according to claim 1 wherein at least one of the docks is attached to the floor structures directly.

35. The building according to claim 1 wherein at least one of the docks is attached to the floor structures by sole plates for dock positioning.

36. The building according to claim 1 wherein the building further includes multiple docks.

37. The building according to claim 36 wherein the multiple docks include at least one of a post, upper beam or brace between the multiple docks.

38. The building according to claim 1 wherein at least one mobile floating dock that comprises at least one floater which is connected to the superstructure by a mechanical assembly, the floater adapted to being lifted and lowered with respect to the superstructure by the mechanical assembly.

39. The building according to claim 38 wherein the actuation of at least one of the mechanical subassemblies is automatically controlled.

40. The building according to claim 38 wherein the actuation of at least one of the mechanical subassemblies is independently controllable.

41. The building according to claim 38 wherein the mechanical subassembly connects the floater to the superstructure by means of a load carrying platform interposed between the superstructure and the mechanical subassembly.

42. The building according to claims 1 wherein the superstructure is sustained by the dock by at least one removable extension subassemblies.

43. The building as defined in claim 1, further comprising at least two superstructures positioned next to each other, on at least one of some supports standing on the ground, each of the superstructure being assembled to at least one of the neighboring superstructure, the superstructures being sequentially carried and transported over the surface by the docks.

44. The building according to claim 43 wherein at least two of the superstructures are detachably assembled to each other.

45. The building according to claim 43 wherein at least two of the superstructures are permanently fixed to each other.

46. The building according to claim 43 wherein the building has multiple supports, at least two of the supports being detachably assembled to each other.

47. The building according to claim 43 wherein the building has multiple supports, at least two of the supports being permanently fixed to each other.

48. A hosting site placed on a shore area and on an adjacent navigable water body that includes at least one of the buildings over the water according to claim 1, sitting on ground, wherein the ground is provided with some sitting surfaces built to match a contact surface of the building's supports, the building and the superstructure and supports being also sequentially carried onto or away from the sitting surface by the mobile floating docks with variable buoyancy.

49. The hosting site according to claim 48, wherein the hosting site is provided with at least one utility and at least one service connected to the installations of the superstructures of the buildings positioned on the sitting surfaces, using their available groups of detachable connectors.

50. The hosting site according to claim 48, wherein the hosting site is provided with at least one maintenance and overhaul areas, at least partially covered by navigable water, where the building over the water, and their superstructures and supports are maneuvered, maintained, and overhauled, with some pedestrian access paths leading to the sitting surfaces and with some vehicle access paths leading to the same said surfaces, with some parking places located close to each surface and used for the vehicles that transport people, hardware, and materials to the sitting surfaces, with some storage sheds and garages positioned close to the surfaces and used for the vehicles, hardware and materials, with some main access roads connected to the access paths and to at least one of the access point onto the hosting site, with some offices, and with some commercial areas that serve the hosting site.

51. The hosting site according to claim 48, wherein the hosting site is provided with at least one partially submersed constructions that separates at least one of some sections of the navigable water body from the rest of the water body, on the section being located at least one of the sitting surfaces on which at least one of the buildings is positioned, the construction being provided with at least one of some gates built in the water, through which the buildings are sequentially carried onto or away from their sitting surface by their mobile floating docks with variable buoyancy.

52. The hosting site according to claim 51, wherein at least one of the constructions is watertight and the gates provided with the construction are also watertight when closed.

53. The hosting site according to claim 48, wherein the hosting site has at least one of the sitting surfaces built using at least one bottom platforms on which at least one support of one of the buildings is positioned, and the bottom platform being also fixed into the ground.

54. The hosting site according to claim 48, wherein the hosting site has at least one of the sitting surfaces built using at least one of some positioning blocks on which at least one of the supports of one of the buildings is positioned and assembled, and also being detachably assembled to the ground.

55. A hosting site according to claim 48, the navigable water body is provided with at least one navigable canals built with at least one navigable connection to the navigable water body that is located beyond the canals, the part of ground consisting of the shores and bottom of the canals being provided with at least one of the sitting surfaces on which at least one of the supports of one of the buildings his positioned, the buildings being also sequentially carried onto or away from the sitting surfaces, by the mobile floating docks with variable buoyancy, through the canals.

56. The hosting site placed on a shore area and on an adjacent navigable water body that includes at least one of the buildings over the water according to claim 1 sitting on ground, wherein the ground upon which the building sits is provided with some sitting surfaces built above the water surface, and built to match at least one of the contact surfaces of the building's superstructure on the building's supports, the superstructure being directly positioned on at least one of the sitting surfaces built above the water surface, with the corresponding support removed, the buildings and the superstructures and the supports being also sequentially carried onto or away from the sitting surface by their mobile floating docks with variable buoyancy.

57. A maneuvering method of a building over the water comprising:
   a superstructure configured to be an inhabitable structure provided with at least one floor structure, the superstructure located entirely above the surface of the water;
   at least one support adapted to sitting on the ground and extending above the surface of the water, the support being positioned under the floor structure, and
   at least one mobile floating dock with variable and controllable buoyancy, each dock being positioned under the floor structures,
   wherein the superstructure is sequentially held above the surface of the water surface by the supports in a fixed position while the supports are sitting on the ground, and respectively in a traveling position the superstructure is detached from ground and from any structure fixed thereto, and carried by the mobile floating docks, and while floating; the superstructure is transported to the desired destination; and at the destination, the superstructure is positioned onto the supports in contact with ground.

58. The maneuvering method of claim 57, further comprising the step where at least one of the docks is first positioned under the superstructure and is attached thereto, and then the step where at least one of the docks is detached from beneath the superstructure and is moved away.

59. A building over the water comprising:
   a superstructure located entirely above the surface of the water, the superstructure configured to be an inhabitable structure provided with at least one floor structure;
   at least one support positioned directly under the floor structure, the support adapted to sit on the ground and extend above the surface of the water in order to hold the superstructure above the surface of the water in a first fixed position; and
   at least one mobile floating dock with variable and controllable buoyancy, partially immersed, positioned under the floor structure and extending above the surface of the water, the floating dock independent from and having no contact with the support and no contact with the ground,
   wherein in a second traveling position the superstructure is held above the surface of the water by the mobile floating docks such that the superstructure is transportable on water on the mobile floating docks.

60. The building according to claim 59 wherein that at least one of the supports is permanently secured to the floor structures.

61. The building according to claim 59 wherein at least one of the docks is detachably secured to the floor structures.

62. The building according to claim 59 wherein at least one of the docks is permanently secured to the floor structures.

63. The building according to claim 59 wherein the support is positioned along the periphery of the floor structure and the mobile floating dock is positioned inboard of the support.

\* \* \* \* \*

UNITED STATES PATENT AND TRADEMARK OFFICE
CERTIFICATE OF CORRECTION

| | | |
|---|---|---|
| PATENT NO. | : 7,824,131 B2 | Page 1 of 1 |
| APPLICATION NO. | : 10/598572 | |
| DATED | : November 2, 2010 | |
| INVENTOR(S) | : Silviu Dorian Chelaru | |

It is certified that error appears in the above-identified patent and that said Letters Patent is hereby corrected as shown below:

Column 20, Line 44, Claim 6:

Delete "to each others" and
Insert -- to each other --.

Column 21, Line 55, Claim 27:

Delete "one of brace" and
Insert -- one brace --.

Column 23, Line 43, Claim 55:

After "one of the buildings"
Delete "his" and
Insert -- is --.

Signed and Sealed this
Eighth Day of February, 2011

David J. Kappos
*Director of the United States Patent and Trademark Office*